United States Patent
Hou et al.

(10) Patent No.: US 12,283,237 B2
(45) Date of Patent: Apr. 22, 2025

(54) SCREEN REFRESH RATE SWITCHING METHOD, ELECTRONIC DEVICE, AND COMPUTER-READABLE STORAGE MEDIUM

(71) Applicant: Honor Device Co., Ltd., Shenzhen (CN)

(72) Inventors: Zhixuan Hou, Shenzhen (CN); Jie Li, Shenzhen (CN); Yong Zhang, Shenzhen (CN); Yongjun Jin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/563,221

(22) PCT Filed: Dec. 28, 2022

(86) PCT No.: PCT/CN2022/142767
§ 371 (c)(1),
(2) Date: Nov. 21, 2023

(87) PCT Pub. No.: WO2023/155606
PCT Pub. Date: Aug. 24, 2023

(65) Prior Publication Data
US 2024/0233630 A1     Jul. 11, 2024

(30) Foreign Application Priority Data
Feb. 21, 2022   (CN) .......................... 202210157195.5

(51) Int. Cl.
*G09G 5/00*       (2006.01)
*G09G 3/3208*   (2016.01)

(52) U.S. Cl.
CPC ... *G09G 3/3208* (2013.01); *G09G 2320/0626* (2013.01); *G09G 2330/022* (2013.01);
(Continued)

(58) Field of Classification Search
CPC ..... G09G 2360/144; G09G 2320/0626; G09G 2340/0435; G09G 2330/021;
(Continued)

(56) References Cited

U.S. PATENT DOCUMENTS

| 2014/0198093 A1 | 7/2014 | Nambi et al. |
| 2015/0287352 A1 | 10/2015 | Watanabe et al. |

(Continued)

FOREIGN PATENT DOCUMENTS

| CN | 106710540 A | 5/2017 |
| CN | 106919358 A | 7/2017 |

(Continued)

*Primary Examiner* — Dennis P Joseph
(74) *Attorney, Agent, or Firm* — Slater Matsil, LLP

(57) ABSTRACT

Embodiments of this application provide a screen refresh rate switching method, an electronic device, and a computer-readable storage medium. The method includes: when a screen is in an idle state, setting, if a plurality of preset conditions are met, a refresh rate of the screen to a first refresh rate, where the plurality of preset conditions includes that a screen luminance is less than a preset screen luminance threshold, an ambient light luminance is less than a preset ambient light luminance threshold, and a proportion of low grayscale pixels of an image that is currently displayed on the screen is greater than a preset proportion; and setting, if none of the plurality of preset conditions is met, the refresh rate of the screen to a second refresh rate, where the second refresh rate is less than the first refresh rate.

20 Claims, 12 Drawing Sheets

(52) U.S. Cl.
CPC . *G09G 2340/0435* (2013.01); *G09G 2354/00* (2013.01); *G09G 2360/144* (2013.01); *G09G 2360/16* (2013.01)

(58) Field of Classification Search
CPC ......... G09G 2320/103; G09G 2354/00; G09G 2360/16; G09G 5/00; G06F 9/451
See application file for complete search history.

(56) References Cited

U.S. PATENT DOCUMENTS

| | | |
|---|---|---|
| 2017/0140713 A1 | 5/2017 | Liu et al. |
| 2022/0270533 A1* | 8/2022 | Ranjan ..................... G09G 3/20 |
| 2023/0386382 A1 | 11/2023 | Cai et al. |
| 2024/0135854 A1* | 4/2024 | Wen ....................... G09G 5/026 |

FOREIGN PATENT DOCUMENTS

| | | |
|---|---|---|
| CN | 109147714 A | 1/2019 |
| CN | 110751933 A | 2/2020 |
| CN | 111816139 A | 10/2020 |
| CN | 112652263 A | 4/2021 |
| CN | 113112945 A | 7/2021 |
| CN | 113722030 A | 11/2021 |
| CN | 113963659 A | 1/2022 |
| WO | 2022005003 A1 | 1/2022 |

\* cited by examiner

SCREEN REFRESH RATE SWITCHING METHOD, ELECTRONIC DEVICE, AND COMPUTER-READABLE STORAGE MEDIUM

CROSS-REFERENCE TO RELATED APPLICATIONS

This application is a national stage of International Application No. PCT/CN2022/142767, filed on Dec. 28, 2022, which claims priority to Chinese Patent Application No. 202210157195.5 filed on Feb. 21, 2022. The disclosures of both of the aforementioned applications are hereby incorporated by reference in their entireties.

TECHNICAL FIELD

This application relates to the field of electronic technologies, and specifically, to a screen refresh rate switching method, an electronic device, and a computer-readable storage medium.

BACKGROUND

With the development of display technologies, a screen refresh rate that an electronic device can support is gradually increasing. For example, an organic light-emitting diode (organic light-emitting diode, OLED) screen can currently support a refresh rate of up to 144 Hz. If the refresh rate is higher, a display fluency of the screen is better. However, if the refresh rate is higher, power consumption is also higher.

In order to take into account both a high refresh rate and low power consumption, people developed an intelligent screen refresh rate switching function. Specifically, when the screen is in an idle (idle) state, the refresh rate is set to a low refresh rate (for example, 60 Hz) to reduce power consumption. When the screen enters an activity (activity) state from the idle state, the refresh rate is switched to a high refresh rate (for example, 120 Hz) to ensure user experience at the high refresh rate.

However, there is a problem of luminance jumping of the screen in a refresh rate switching process.

SUMMARY

This application provides a screen refresh rate switching method, an electronic device, and a computer-readable storage medium, which can solve a problem of luminance jumping of the screen and improve user experience.

According to a first aspect, this application provides a screen refresh rate switching method, and the method is performed by an electronic device. The method includes:
when a screen is in an idle state, setting, if a plurality of preset conditions are met, a refresh rate of the screen to a first refresh rate, where the plurality of preset conditions includes that a screen luminance is less than a preset screen luminance threshold, an ambient light luminance is less than a preset ambient light luminance threshold, and a proportion of low grayscale pixels of an image that is currently displayed on the screen is greater than a preset proportion, and the proportion of low grayscale pixels refers to a proportion of pixels in the image whose grayscale values are less than a preset grayscale threshold; and setting, if none of the plurality of preset conditions is met, the refresh rate of the screen to a second refresh rate, where the second refresh rate is less than the first refresh rate.

That is to say, the first refresh rate is a higher refresh rate of the two refresh rates between which the screen intends to switch (hereinafter referred to as a high refresh rate), and the second refresh rate is a lower refresh rate of the two refresh rates between which the screen intends to switch (hereinafter referred to as a low refresh rate).

If the screen luminance is less than the preset screen luminance threshold, it indicates that the screen has a low luminance; if the ambient light luminance is less than the preset ambient light threshold, it indicates that the electronic device is currently in a low-luminance environment; and if the proportion of low grayscale pixels is greater than the preset proportion, it indicates that the image that is currently displayed on the screen is a low-grayscale image. In the screen refresh rate switching method provided in the first aspect, in a case that the screen is in the idle state, if the plurality of preset conditions are met, it indicates that the screen is in a dark light scenario (the screen has a low luminance and the electronic device is in a low-luminance environment), and the image that is currently displayed on the screen is a low-grayscale image. In the current situation, switching of the refresh rate causes luminance jumping, so the refresh rate of the screen is set to the first refresh rate. That is to say, when the screen is in the idle state and the current scenario is a dark light and low-grayscale scenario, a frame rate is locked to the high refresh rate. In this way, when the user touches the screen again and the screen enters an activity state from the idle state, it is unnecessary to switch the refresh rate frequently, thereby avoiding the luminance jumping, avoiding discomfort to eyes of the user, and improving user experience. In addition, if none of the plurality of preset conditions is met, it indicates that the current scenario is not the dark light and low-grayscale scenario. In the current situation, switching of the refresh rate does not cause the luminance jumping. Therefore, the refresh rate is set to the low refresh rate, which can reduce power consumption, extend a standby duration of the electronic device, and further improve user experience. In addition, conditions for locking the frame rate to the high refresh rate (that is, frame rate locking conditions) in this embodiment include both conditions for the dark light scenario and conditions for the low-grayscale image. Only in a case that the current scenario is the dark light scenario and the current image is the low-grayscale image, the frame rate is locked to the high refresh rate. In other words, the frame rate locking conditions in this embodiment are strict, which can improve the accuracy of identifying the luminance jumping, improve the accuracy of the switching of the refresh rate, and make it more difficult to switch the refresh rate to the high refresh rate and easier to keep the refresh rate at the low refresh rate, thereby reducing the probability of locking the frame rate to the high refresh rate in an unnecessary case, reducing unnecessary power consumption, extending the standby duration of the electronic device, and improving user experience. The locking the frame rate to the high refresh rate in an unnecessary case includes: the frame rate is locked to the high refresh rate in a scenario with a low screen luminance and a high ambient light luminance, or the frame rate is locked to the high refresh rate in a scenario with a high screen luminance and a low ambient light luminance, or the frame rate is locked to the high refresh rate in a dark light scenario but in a case that the current image is a high-grayscale image.

With reference to the first aspect, in some implementations of the first aspect, the method further includes: identifying a current application scenario of the electronic device; and determining the preset proportion according to the current application scenario of the electronic device.

In a possible implementation, the determining the preset proportion according to the current application scenario of the electronic device includes: obtaining a correspondence between a preset application scenario and a threshold weight; determining, according to the correspondence, a target threshold weight corresponding to the current application scenario of the electronic device; and determining the preset proportion according to the target threshold weight.

Optionally, the preset application scenario may include a text reading scenario, a video or audiovisual scenario, and other scenarios. A threshold weight corresponding to the text reading scenario may be less than threshold weights corresponding to the other scenarios, and the threshold weights corresponding to the other scenarios are less than a threshold weight corresponding to the video or audiovisual scenario. The threshold weight may be a positive value or a negative value. For example, the threshold weight may be −10% in the text reading scenario, the threshold weight may be 10% in the video or audiovisual scenario, and the threshold weights may be −5% in the other scenarios. For the text reading scenario, the grayscale of the image is low, the frequency with which the user touches the screen is high, and the possibility of the luminance jumping is large. Therefore, the threshold weight in this application scenario is set to a small value and to a negative value to reduce the preset proportion, thereby reducing the frame rate locking condition, making it easier to lock the refresh rate to the high refresh rate, and preventing the luminance jumping. For the video or audiovisual scenario, the grayscale of the image is high, the frequency with which the user touches the screen is low, and the possibility of the luminance jumping is small. Therefore, the threshold weight in this scenario is set to a large value and to a positive value to increase the preset proportion, thereby improving the frame rate locking condition, making it easier for the refresh rate to fall back to the low refresh rate, preventing the luminance jumping, and better reducing power consumption. For the other scenarios, each of the grayscale of the image and the frequency with which the user touches the screen is between that in the text reading scenario and that in the video or audiovisual scenario. Therefore, the threshold weights in the scenarios are also between the threshold weights corresponding to these two scenarios.

In this implementation, the threshold weight is determined according to the current application scenario of the electronic device, and the preset proportion is determined according to the threshold weight. In this way, the preset proportion can be dynamically set with reference to the current application scenario of the electronic device, that is, the conditions for judging the low-grayscale image can be dynamically set, and the grayscale of the image and the frequency with which the user touches the screen in different scenarios are fully taken into consideration, so that a judgment result of the grayscale status of the image is more accurate, thereby making the frame rate locking condition more accurate and the result of refresh rate switching also more accurate, and improving the user experience. In addition, the preset proportion is determined according to the current application scenario of the electronic device, and then the refresh rate is switched, so that the screen refresh rate switching method provided in this embodiment is applicable to various application scenarios and the applicability of the method is improved.

In a possible implementation, the determining the preset proportion according to the target threshold weight includes: determining a threshold increment according to the target threshold weight; and summing a preset basic threshold and the threshold increment to obtain the target preset proportion.

There are various methods for determining the threshold increment according to the target value weight. For example, the correspondence between the threshold weight and the threshold increment may be predetermined, and the threshold increment corresponding to the target threshold weight is determined according to the correspondence.

In a possible implementation, the determining a threshold increment according to the target threshold weight includes: calculating a product of the target threshold weight and the preset basic threshold to obtain the threshold increment.

That is to say, preset proportion=preset basic threshold+threshold increment=preset basic threshold+preset basic threshold*target threshold weight. Optionally, the preset basic threshold may be, for example, 70%.

In a possible implementation, the setting, if a plurality of preset conditions are met, a refresh rate of the screen to a first refresh rate includes: when the refresh rate of the screen is the second refresh rate at a current moment, switching, if a target condition is met, the refresh rate of the screen from the second refresh rate to a third refresh rate, where the target condition is one or two preset conditions of the plurality of preset conditions, and the third refresh rate is greater than the second refresh rate and less than the first refresh rate; and switching, if conditions other than the target condition of the plurality of preset conditions are met, the refresh rate of the screen from the third refresh rate to the first refresh rate.

The third refresh rate is between the high refresh rate and the low refresh rate, and is an intermediate refresh rate.

In this implementation, in a case that the screen is in the idle state and the current refresh rate of the screen is the low refresh rate, if the previous scenario meets one or two of the plurality of preset conditions, the refresh rate of the screen is switched from the low refresh rate to the intermediate refresh rate. When other conditions are further met, the refresh rate of the screen is switched from the intermediate refresh rate to the high refresh rate. In this way, in a case that the screen is in the idle state and switching of the refresh rate causes the luminance jumping, the frame rate is eventually locked to the high refresh rate. When the user touches the screen again and the screen enters the activity state from the idle state, it is unnecessary to switch the refresh rate frequently, thereby avoiding the luminance jumping. In addition, this implementation realizes level-by-level refresh rate switching. The level-by-level refresh rate switching can avoid the luminance jumping caused by this switching of the refresh rate. That is to say, in the execution process of the method of this embodiment, the luminance jumping does not occur when the refresh rate is switched from the low refresh rate to the high refresh rate, further improving the user experience.

In a possible implementation, the target condition is that the proportion of low grayscale pixels of the image that is currently displayed on the screen is greater than the preset proportion.

The proportion of low grayscale pixels of the image that is currently displayed on the screen is greater than the preset proportion, which indicates that the image that is currently displayed on the screen is a low-grayscale image. In the low-grayscale image, the user is more likely to be in a dark light scenario. Therefore, in this implementation, the target condition is set to that the proportion of low grayscale pixels of the image that is currently displayed on the screen is greater than the preset proportion, which is more in line with the actual situation and highly practical.

In a possible implementation, when the screen is in the idle state, the method further includes: judging whether the screen luminance is less than the preset screen luminance threshold; determining, if the screen luminance is greater than or equal to the preset screen luminance threshold, that none of the plurality of preset conditions is met; judging, if the screen luminance is less than the preset screen luminance threshold, whether the ambient light luminance is less than the preset ambient light luminance threshold; determining, if the ambient light luminance is greater than or equal to the preset ambient light luminance threshold, that none of the plurality of preset conditions is met; judging, if the ambient light luminance is less than the preset ambient light luminance threshold, whether the proportion of low grayscale pixels of the image that is currently displayed on the screen is greater than the preset proportion; determining, if the proportion of low grayscale pixels of the image that is currently displayed on the screen is less than or equal to the preset proportion, that none of the plurality of preset conditions is met; and determining, if the proportion of low grayscale pixels of the image that is currently displayed on the screen is greater than the preset proportion, that the plurality of preset conditions are met.

In this implementation, the plurality of preset conditions are judged one by one, and in a case that one preset condition is met, a next preset condition is judged, which reduces the execution of unnecessary steps, improves the speed of judgment, and improves algorithm running efficiency.

In a possible implementation, the method further includes: obtaining the image that is currently displayed on the screen; converting the image that is currently displayed on the screen into a grayscale image; and obtaining a proportion of pixels in the grayscale image whose grayscale values are less than the preset grayscale threshold to obtain the proportion of low grayscale pixels.

In a possible implementation, the obtaining a proportion of pixels in the grayscale image whose grayscale values are less than the preset grayscale threshold to obtain the proportion of low grayscale pixels includes: dividing the grayscale image into a plurality of grayscale sub-images; obtaining a grayscale histogram of each grayscale sub-image; determining, according to the grayscale histogram of each grayscale sub-image, a grayscale histogram of the image that is currently displayed on the screen; and determining, according to the grayscale histogram of the image that is currently displayed on the screen, the proportion of pixels that are less than the preset grayscale threshold, to obtain the proportion of low grayscale pixels of the image that is currently displayed on the screen.

Optionally, the preset grayscale threshold may range from 15 to 20, and may be, for example, 17.

In this implementation, the image that is currently displayed on the screen is converted into the grayscale image, then a grayscale value of each pixel in the grayscale image is obtained, and statistics are collected on a total quantity of pixels in the grayscale image whose grayscale values are in each grayscale section, so that a proportion of a quantity of pixels whose grayscale values are less than the preset grayscale threshold is determined, to obtain the proportion of low grayscale pixels of the image that is currently displayed on the screen. Statistics may be collected on the proportion of pixels with lower grayscale in the image quantitatively and accurately, thereby accurately reflecting the grayscale status of the image that is currently displayed on the screen, improving the accuracy of the judgment of the frame rate locking condition, improving the accuracy of the switching of the refresh rate, and improving the user experience. In addition, in this implementation, the grayscale image is divided into the plurality of grayscale sub-images, the grayscale histogram of each grayscale sub-image is obtained, and the grayscale histogram of the image that is currently displayed on the screen is determined according to the grayscale histogram of each grayscale sub-image, which can further improve the accuracy of grayscale statistics, thereby improving the accuracy of calculation of the proportion of low grayscale pixels, improving the accuracy of the judgment of the frame rate locking condition, improving the accuracy of the switching of the refresh rate, and improving the user experience. In addition, in this implementation, grayscale statistics are performed through grayscale histogram statistics, which can improve the efficiency and accuracy of grayscale statistics and have strong versatility.

In a possible implementation, the electronic device includes a screen luminance obtaining module, an adaptive power saving APS module, a sensor service, and a display engine module that are located at an application framework layer, a grayscale histogram statistics module located at a hardware abstraction layer, an advances graphic projects AGP module located at a native layer, and an ambient light sensor located at a hardware layer, and the method further includes:

determining, by the screen luminance obtaining module, the screen luminance, and sending the screen luminance to the APS module; obtaining, by the sensor service through the ambient light sensor, the ambient light luminance, and sending the ambient light luminance to the APS module; determining, by the APS module, whether the screen luminance is less than the preset screen luminance threshold, determining whether the ambient light luminance is less than the ambient light luminance threshold to obtain a luminance judgment result, and sending the luminance judgment result to the AGP module; collecting, by the grayscale histogram statistics module, statistics on a grayscale histogram of the image that is currently displayed on the screen, and sending the grayscale histogram to the display engine module; calculating, by the display engine module according to the grayscale histogram, the proportion of low grayscale pixels of the image that is currently displayed on the screen, and sending the proportion of low grayscale pixels of the image that is currently displayed on the screen to the AGP module; and when the screen is in the idle state, setting, by the AGP module if it is determined that the plurality of preset conditions are met, the refresh rate of the screen to the first refresh rate; or setting, if it is determined that none of the plurality of preset conditions is met, the refresh rate of the screen to the second refresh rate.

In a possible implementation, the electronic device further includes a scenario identification module located at the application framework layer, and the method further includes: determining, by the scenario identification module according to a running status of an application in the electronic device, the current application scenario of the electronic device to obtain a scenario identification result, and sending the scenario identification result to the AGP module; and determining, by the AGP module, the preset proportion according to the current application scenario of the electronic device.

In a possible implementation, the electronic device further includes a power management module located at the application framework layer and a setting application located at an application layer, and the determining, by the screen luminance obtaining module, the screen luminance includes: obtaining, by the power management module through the setting application, a luminance level, and sending the luminance level to the screen luminance obtaining module; and determining, by the screen luminance obtaining module, the screen luminance according to the luminance level.

The power management module can set and update the screen luminance according to luminance parameters provided by the setting application. In this implementation, a luminance level is obtained from the setting application through the power management module, and the luminance level is sent to the screen luminance obtaining module, so that the screen luminance obtaining module can more accurately obtain the currently set luminance level of the screen and improve accuracy of the determined screen luminance, thereby improving the accuracy of the switching of the refresh rate.

In a possible implementation, the sending the luminance judgment result to the AGP module includes: sending, by the APS module through Binder communication, the luminance judgment result to the AGP module; and the sending the proportion of low grayscale pixels of the image that is currently displayed on the screen to the AGP module includes: sending, by the display engine module through the Binder communication, the proportion of low grayscale pixels of the image that is currently displayed on the screen to the AGP module.

In this implementation, the APS module and the display engine module send data to the AGP module through the Binder communication, which can achieve cross-process communication and improve the security and transmission efficiency of data transmission.

According to a second aspect, this application provides an apparatus, the apparatus is included in an electronic device, and the apparatus has functions of realizing behaviors of the electronic device in the foregoing first aspect and possible implementations of the foregoing first aspect. The functions may be implemented by using hardware, or may be implemented by hardware executing corresponding software. The hardware or the software includes one or more modules or units corresponding to the functions, for example, a receiving module or unit, and a processing module or unit.

According to a third aspect, this application provides an electronic device, and the electronic device includes: a processor, a memory, and an interface; and the processor, the memory, and the interface cooperate with each other to enable the electronic device to perform any method in the technical solutions of the first aspect.

According to a fourth aspect, this application provides a chip, including a processor. The processor is configured to read and execute a computer program stored in a memory, to perform the method in the first aspect and any possible implementation of the first aspect.

Optionally, the chip further includes a memory, and the memory is connected to the processor through a circuit or a wire.

Further, optionally, the chip further includes a communication interface.

According to a fifth aspect, this application provides a computer-readable storage medium, the computer-readable storage medium storing a computer program, and the computer program, when executed by a processor, enabling the processor to perform any method in the technical solutions of the first aspect.

According to a sixth aspect, this application provides a computer program product, the computer program product including: computer program code, and the computer program code, when run on an electronic device, enabling the electronic device to perform any method in the technical solutions of the first aspect.

DETAILED DESCRIPTION OF ILLUSTRATIVE EMBODIMENTS

Figure 1A:
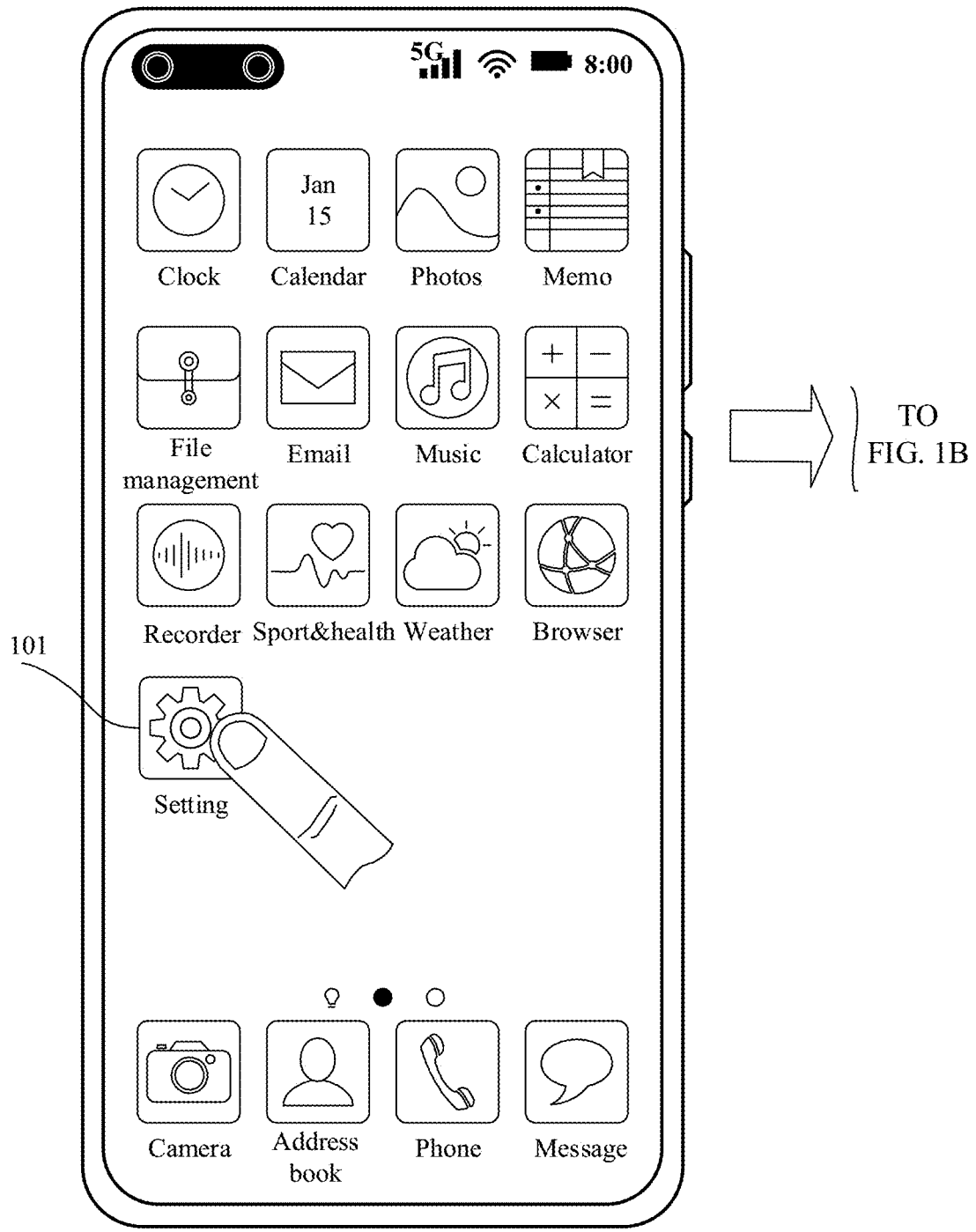
FIG. 1A, FIG. 1B, FIG. 1C, and FIG. 1D are schematic diagrams of an interface change corresponding to a setting process of an intelligent refresh rate switching mode according to an embodiment of this application.

Technical solutions in embodiments of this application are described below with reference to the accompanying drawings in the embodiments of this application. In the descriptions of the embodiments of this application, "/" means "or" unless otherwise specified. For example, A/B may represent A or B. The term "and/or" in this specification describes only an association relationship for describing associated objects and represents that three relationships may exist. For example, A and/or B may represent the following three cases: the following three cases: only A exists, both A and B exist, and only B exists. In addition, in the descriptions in embodiments of this application, "a plurality of" means two or more.

The terms "first", "second", and "third" mentioned below are merely intended for a purpose of description, and shall not be understood as an indication or implication of relative importance or implicit indication of the quantity of indicated technical features. Therefore, features defining "first", "second", and "third" may explicitly or implicitly include one or more such features.

Reference to "an embodiment" or "some embodiments", or the like described in the specification of this application means that particular features, structures, or characteristics described with reference to the embodiment are included in one or more embodiments of this application. Therefore, the statements "in one embodiment", "in some embodiments", "in some other embodiments", "in still some other embodiments" appearing at different positions in this specification of this application do not necessarily refer to the same embodiment, but mean "one or more but not all embodiments", unless otherwise particularly emphasized in other ways. The terms "comprise", "include", "have", and variations thereof all mean "include but is not limited to", unless otherwise specially emphasized.

In order to better understand the embodiments of this application, terms or concepts that may be involved in the embodiments are explained and described below.

A screen refresh rate refers to a refresh rate of a screen of an electronic device, is also referred to as hardware refresh rate or the like, and is briefly referred to as refresh rate, and the unit is Hertz (Hz).

An idle (idle) state refers to that a user does not perform a touch operation on the screen within a preset duration, and the screen of the electronic device does not detect touch data within the preset duration. The touch operation may include operations such as tap, slide, or long press.

An activity (activity) state refers to that a user performs a touch operation on the screen within a preset duration, and the screen of the electronic device detects touch data within the preset duration.

A screen luminance, also referred to as backlight luminance or the like, is a physical quantity that represents a luminous intensity of the screen of the electronic device, and the unit may be nit (nit) or candelas per square meter ($cd/m^2$).

An ambient light luminance, also referred to as ambient light intensity, ambient light illumination, or the like, is a physical quantity that represents an intensity of illumination in a surrounding environment in which the electronic device is located, and the unit may be lux (lux).

A grayscale, also referred to as gray scale, is a parameter that represents lightness and darkness of an image. The image includes a plurality of pixels (pixels), and each pixel may present a variety of different colors. These colors include three sub-pixels: red, green, and blue (RGB). A light source behind each sub-pixel may exhibit different luminance levels. The grayscale represents the different luminance levels from the darkest to the lightest. For an 8-bit (bit) screen, an image may include a total of 256 luminance levels from 0 to 255, that is, the image may include a total of 256 grayscales from 0 to 255.

A screen refresh rate switching method provided in an embodiment of this application is described below.

Currently, screens of many electronic devices can support a plurality of refresh rates. For example, a liquid crystal display (liquid crystal display, LCD) screen and an OLED screen can support a plurality of refresh rates such as 60 Hz, 90 Hz, and 120 Hz. In addition, each electronic device that can support a plurality of refresh rates generally has an intelligent refresh rate switching mode. In the intelligent refresh rate switching mode, the refresh rate of the screen can be intelligently switched between two different refresh rates. For example, the refresh rate can be switched between 90 Hz and 60 Hz, or the refresh rate can be switched between 120 Hz and 90 Hz. In two different refresh rates, a higher refresh rate is referred to as a high refresh rate, and a lower refresh rate is referred to as a low refresh rate.

Figure 1B:
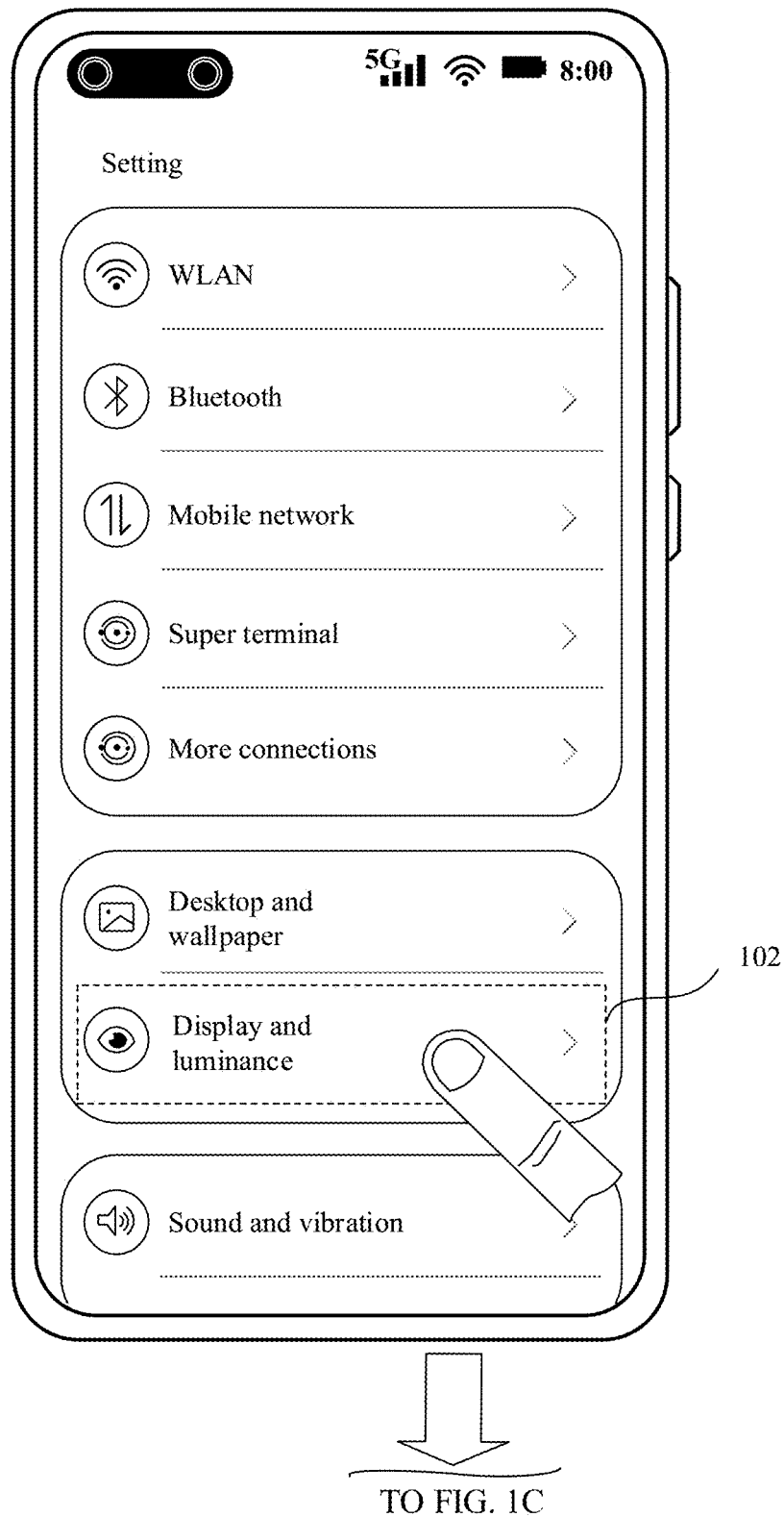
Figure 1C:
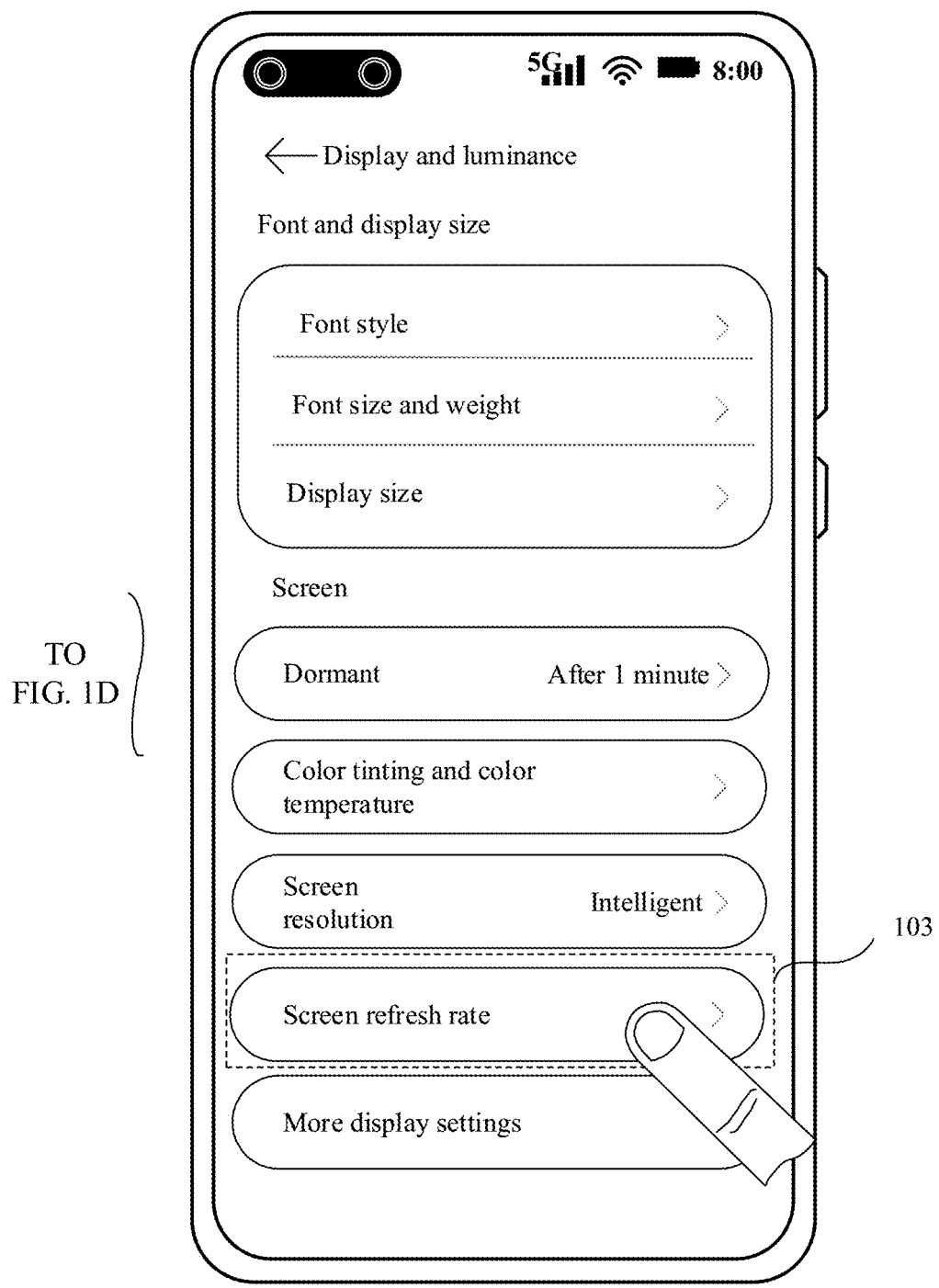
Figure 1D:
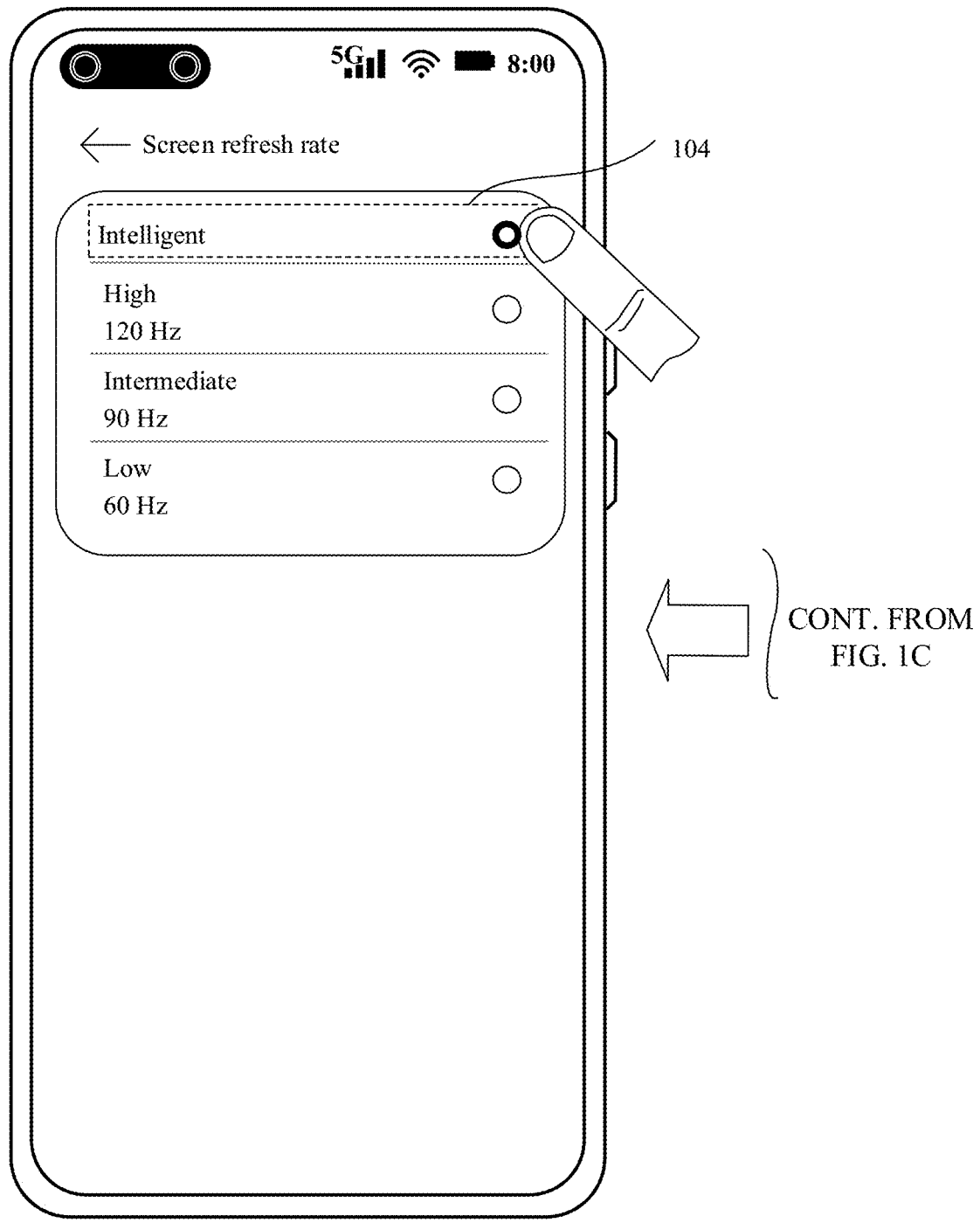

The user may set the intelligent refresh rate switching mode for the electronic device according to needs. For example, FIG. 1A, FIG. 1B, FIG. 1C, and FIG. 1D are schematic diagrams of an interface change corresponding to a setting process of an intelligent refresh rate switching mode according to an embodiment of this application. Taking an example in which the electronic device is a mobile phone for description, as shown in FIG. 1A, the user may enter a setting interface of the mobile phone by tapping a setting application (application, APP) 101 on a desktop, as shown in FIG. 1B. The setting interface may include a display and luminance setting control 102. The user taps this control to enter a display and luminance setting interface, as shown in FIG. 1C. The display and luminance setting interface may include a screen refresh rate setting control 103. The user taps this control to enter a screen refresh rate setting interface, as shown in FIG. 1D. The screen refresh rate setting interface may include low, intermediate, and high refresh rate options and an intelligent switching option 104. When the user taps the intelligent switching option 104, the screen refresh rate of the mobile phone is set to an intelligent switching mode, and the mobile phone can intelligently switch the refresh rate according to a preset policy.

In an implementation, a policy for the electronic device to dynamically switch the refresh rate is that when the user does not touch the screen and the screen is in the idle state, the refresh rate is set to a low refresh rate (for example, 60 Hz); and when the user touches the screen and the screen is switched from the idle state to the activity state, the refresh rate is switched to a high refresh rate (for example, 120 Hz). In this way, the policy can not only ensure the fluency of the image when the user is using the electronic device and satisfy user experience at the high refresh rate, but also reduce power consumption when the user does not touch the screen, achieving both the high refresh rate and low power consumption.

However, it is found during use that for some screens represented by the OLED, when the screen is touched in a dark light scenario (that is, the screen luminance is low and the ambient light luminance is low), and the refresh rate is switched from the low refresh rate to the high refresh rate, luminance jumping identifiable to human eyes occurs on the screen, that is, screen flickering occurs, which affects the user experience. Specifically, the screen includes a plurality of pixels, and each pixel may include a light-emitting element (OLED) and a pixel circuit that provides a driving current to the light-emitting element. The pixel circuit may include a pixel switch. The opening and closing of the pixel switch are controlled by inputting a pulse signal (for example, an electromagnetic pulse (EM pulse) signal) to the pixel circuit to control the on and off of the pixel circuit, thereby controlling the light emission of the light-emitting element. Since different refresh rates correspond to different pulse signals, quantities of opening and closing times of the pixel switch are different, and durations for which the pixel switch remains open are different. Within a pulse cycle, durations for which the pixel switch remains open are different, light-emitting statuses of the light-emitting element are different, and screen luminances are different (a longer duration for which the pixel switch remains open indicates a higher screen luminance). Therefore, screen luminances are different at different refresh rates, so refresh rate switching causes a screen luminance change.

In addition, it can be understood that since a luminance perceived by human eyes is not directly proportional to a physical power, gamma correction is generally performed through a gamma (gamma) curve. The gamma curve represents a nonlinear relationship between a display luminance and an input voltage. Through gamma correction, the input voltage of the screen is ultimately directly proportional to the luminance perceived by the human eyes. In order to make up for a difference between screen luminances at different refresh rates, an OLED screen configures different gamma curves for the different refresh rates. However, in fact, screen luminances under two refresh rates cannot be completely consistent. When the refresh rate is switched in a dark light scenario, there is still a luminance change identifiable to the human eyes. Because a relationship between a minimum perceptible luminance difference of the human eyes and a background luminance (that is, the luminance before change) satisfies Weber's law. When the screen is touched in a dark light scenario, for the human eyes, the background luminance is small and a luminance change amount is large, where $\Delta L/L \geq 20.017$. Therefore, the human eyes can identify the screen flickering, and the luminance jumping identifiable to the human eyes occurs on the screen. $\Delta L$ represents the luminance change amount, and L represents the background luminance.

In addition, the inventor further finds that when an image that is currently displayed on the screen is a low-grayscale image, the luminance jumping also occurs on the screen when the user touches the screen. Through research and analysis, it is found that the grayscale status of the image is also an important factor affecting the luminance jumping of the screen. The reason is that when the image displayed on the screen is a high-grayscale image, screen luminance changes are not easily identified by the human eyes, and when the image displayed on the screen is a low-grayscale image, screen luminance changes are more easily identified by the human eyes.

In view of this, an embodiment of this application provides a screen refresh rate switching method, and the method can solve the problem of the luminance jumping.

An electronic device to which the screen refresh rate switching method provided in this application is applicable and a specific process of the method are described below with reference to embodiments.

The screen refresh rate switching method provided in the embodiments of this application is applicable to an electronic device with a screen such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). The screen of the electronic device may be a screen such as an OLED screen. The specific type of the electronic device is not limited in the embodiments of this application.

Figure 2:
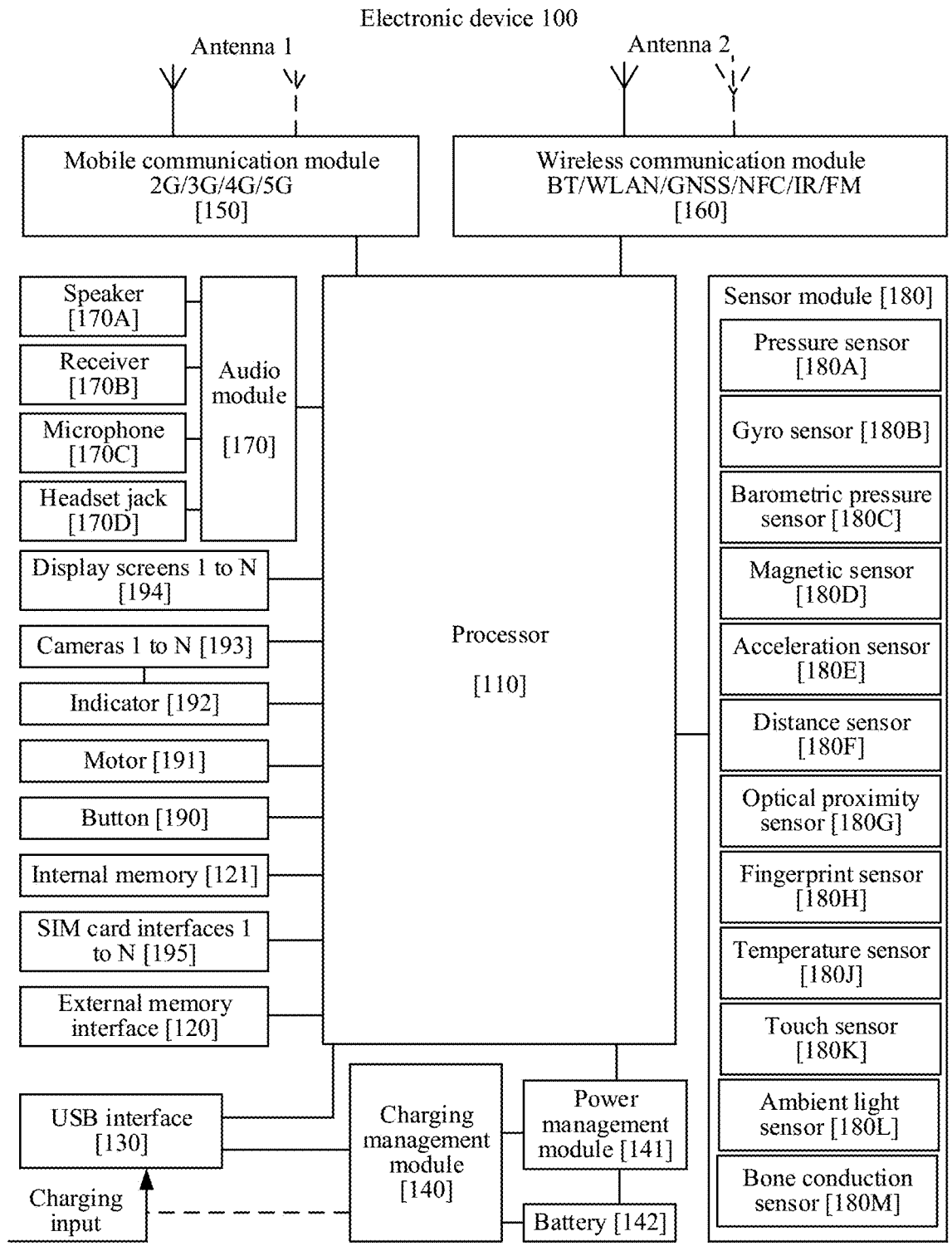
FIG. 2 is a schematic diagram of a structure of an electronic device according to an embodiment of this application.

For example, FIG. 2 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in the embodiments of this application does not constitute a specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal according to an instruction operation code and a timing signal, and implement control on instruction reading and instruction execution.

A memory may be further arranged in the processor 110, and is configured to store an instruction and data. In some embodiments, the memory in the processor 110 is a cache memory. The memory may store an instruction or data that is recently used or cyclically used by the processor 110. If the processor 110 needs to use the instruction or the data again, the processor may directly invoke the instruction or the data from the memory. Repeated access is avoided, and a waiting time of the processor 110 is reduced, thereby improving system efficiency.

The electronic device 100 implements a display function through the GPU, the display screen 194, the application processor, and the like. The GPU is a microprocessor for image processing, and is connected to the display screen 194 and the application processor. The GPU is configured to perform mathematical and geometric calculations and perform graphics rendering. The processor 110 may include one or more GPUs and execute program instructions to generate or change display information.

The display screen 194, also referred to as display or screen, is configured to display an image, a video, and the like. The display screen 194 includes a display panel. The display panel may be an OLED display panel. In some embodiments, the electronic device 100 may include 1 or N display screens 194, and N is a positive integer greater than 1.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

The ambient light sensor 180L is configured to sense an ambient light luminance. The electronic device 100 may adaptively adjust a luminance of the display screen 194 according to the perceived ambient light luminance. The ambient light sensor 180L may be further configured to automatically adjust white balance during photo taking. The ambient light sensor 180L may further cooperate with the optical proximity sensor 180G to detect whether the electronic device 100 is in a pocket, so as to prevent an accidental touch.

The touch sensor 180K is also referred to as a "touch panel". The touch sensor 180K may be disposed on the display screen 194, and the touch sensor 180K and the display screen 194 form a touchscreen, which is also referred to as a "touch screen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by the display screen 194. In some other embodiments, the touch sensor 180K may be alternatively disposed on a surface of the electronic device 100, and is located on a position different from that of the display screen 194.

Figure 3:
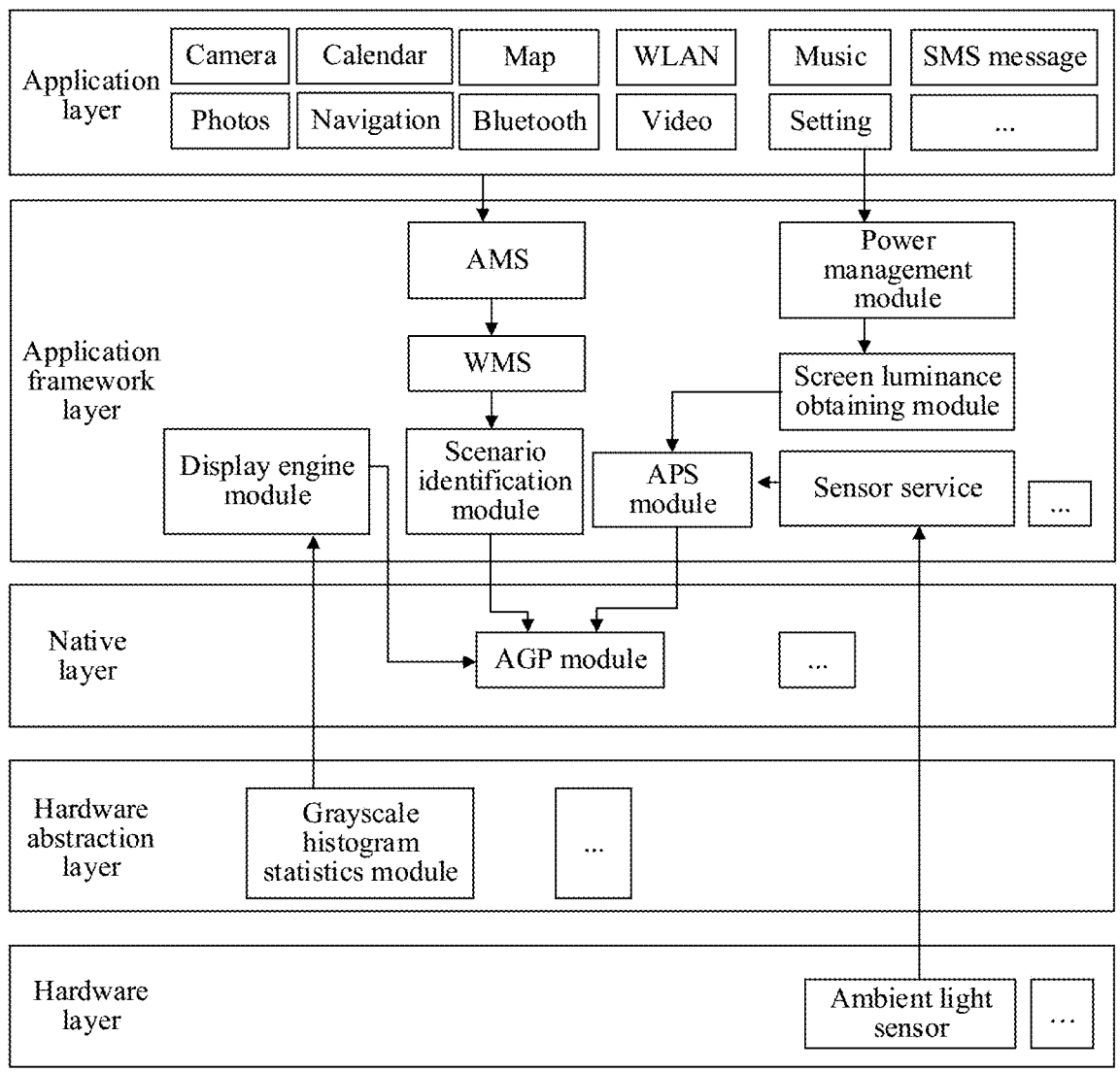
FIG. 3 is a schematic diagram of a software structure of an electronic device and a relationship between the software structure and a hardware layer according to an embodiment of this application.

FIG. 3 is a schematic diagram of a software structure of an electronic device 100 and a relationship between the software structure and a hardware layer according to an embodiment of this application. As shown in FIG. 3, in this embodiment of this application, the hardware layer (hardware layer) may include the ambient light sensor 180L in the embodiment shown in FIG. 2. The ambient light luminance is collected through the ambient light sensor.

A software system of the electronic device 100 may use a layered architecture, an event-driven architecture, a microkernel architecture, a micro service architecture, or a cloud architecture. In this embodiment of this application, the software structure of the electronic device 100 is exemplarily described by using an Android system with a layered architecture as an example. In the layered architecture, software is divided into several layers, and each layer has a clear role and task. The layers communicate with each other through software interfaces. As shown in FIG. 3, in this embodiment of this application, the Android system includes an application layer, an application framework layer, a Native (Native) layer, and a hardware abstraction layer (hardware abstract layer, HAL) from top to bottom.

The hardware abstraction layer is an abstract interface of a device kernel driver, and is configured to provide an application programming interface for accessing an underlying device to a higher-level API framework. In this embodiment, the hardware abstraction layer may include a grayscale histogram statistics module. The grayscale histogram statistics module is configured to collect statistics on a grayscale histogram of an image that is currently displayed on the screen.

The Native layer may also be referred to as a native framework layer, a native algorithm layer, a native service layer, or the like. In this embodiment of this application, the Native layer may include an advances graphic projects (advances graphic projects, AGP) module.

The application layer may include a series of application packages. The application packages may include applications such as camera, photos, calendar, maps, navigation, WLAN, Bluetooth, music, videos, and SMS messages. In this embodiment, the application layer further includes a setting (setting) application. The setting application is used to set various parameters of the electronic device, including the screen luminance. Optionally, the setting of the screen luminance by the setting application may be a setting made in response to a direct operation performed by the user in the setting application, or may be a setting made in response to a related operation performed by the user in another application. For example, the setting application may set the screen luminance in response to a luminance setting operation performed by the user in a video application.

The application framework layer provides an application programming interface (application programming interface, API) and a programming framework for applications at the application layer. The application framework layer includes some predefined functions.

As shown in FIG. 3, in this embodiment of this application, the application framework layer may include at least a display engine (display engine) module, an activity manager service (activity manger service, AMS), a windows manager service (windows manger service, WMS), a scenario identification module, a power management module, a screen luminance obtaining module, a sensor service, and an adaptive power saving (adaptive power saving, APS) module. The display engine module is configured to calculate a proportion of low grayscale pixels of the image that is currently displayed on the screen (hereinafter referred to as the proportion of low grayscale pixels) according to the grayscale histogram obtained statistically by the grayscale histogram statistics module of the hardware abstraction layer. The low grayscale pixel refers to a pixel in the image whose grayscale value is less than a preset grayscale threshold. The scenario identification module is configured to determine a current application scenario of the electronic device according to a running status of an application in the application layer, obtain a scenario identification result, and send the scenario identification result to the AGP module. The scenario identification module may be, for example, an iaware module. The power management module is configured to update the screen luminance according to a luminance parameter provided by the setting application in the application layer, and send the luminance parameter to the screen luminance obtaining module. The screen luminance obtaining module is configured to determine the screen luminance according to the luminance parameter. The screen luminance obtaining module sends the determined screen luminance to the APS module. The sensor service is configured to obtain the ambient light luminance from the ambient light sensor in the hardware layer and report the obtained ambient light luminance to the APS module. The APS module is configured to judge whether the screen luminance and/or the ambient light luminance meets a preset condition to obtain a luminance judgment result, and send the luminance judgment result to the AGP module. In addition, a grayscale calculation module of the hardware abstraction layer sends the proportion of low grayscale pixels obtained through calculation to the AGP module.

The AGP module of the Native layer is configured to switch the refresh rate according to the scenario identification result sent by the scenario identification module, the luminance judgment result sent by the APS module, and the proportion of low grayscale pixels sent by the grayscale calculation module.

In addition, the application framework layer may further include a content provider, a view system, a phone manager, a resource manager, a notification manager, and the like (not shown in FIG. 3).

For ease of understanding, in the following embodiments of this application, the screen refresh rate switching method provided in this embodiment of this application is specifically described with reference to accompanying drawings and application scenarios and by taking the electronic device with the structures shown in FIG. 2 and FIG. 3 as an example.

It should be noted that the screen refresh rate switching method provided in this embodiment of this application is applied to the intelligent refresh rate switching mode shown in FIG. 1A, FIG. 1B, FIG. 1C, and FIG. 1D, and this application does not limit two refresh rates switched between each other in the intelligent refresh rate switching mode.

In addition, as mentioned in the foregoing embodiments, when the screen is in the activity state, in order to ensure the fluency of the image, a high refresh rate needs to be maintained for the refresh rate. Therefore, in this embodiment of this application, only the solution for switching the refresh rate of the screen in the idle state is described. The switching of the refresh rate of the screen in the activity state, and the switching of the refresh rate of the screen entering the activity state from the idle state, or the switching of the refresh rate of the screen entering the idle state from the activity state are not described in detail. That is to say, in the following embodiments, the switching of the refresh rate is performed when the screen is in the idle state.

Figure 4A:
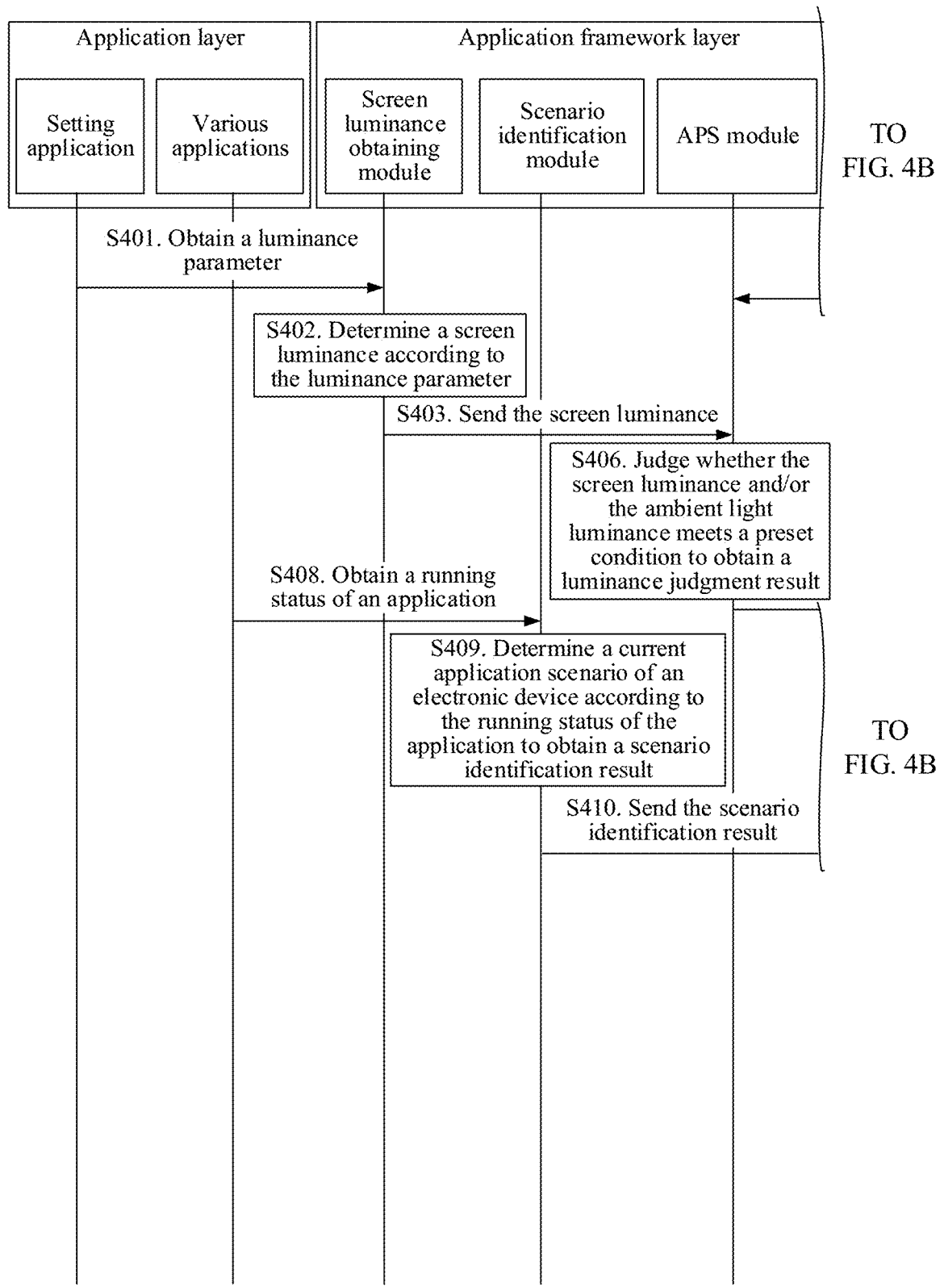
FIG. 4A and FIG. 4B are schematic diagrams of module interaction corresponding to a screen refresh rate switching method according to an embodiment of this application.
Figure 4B:
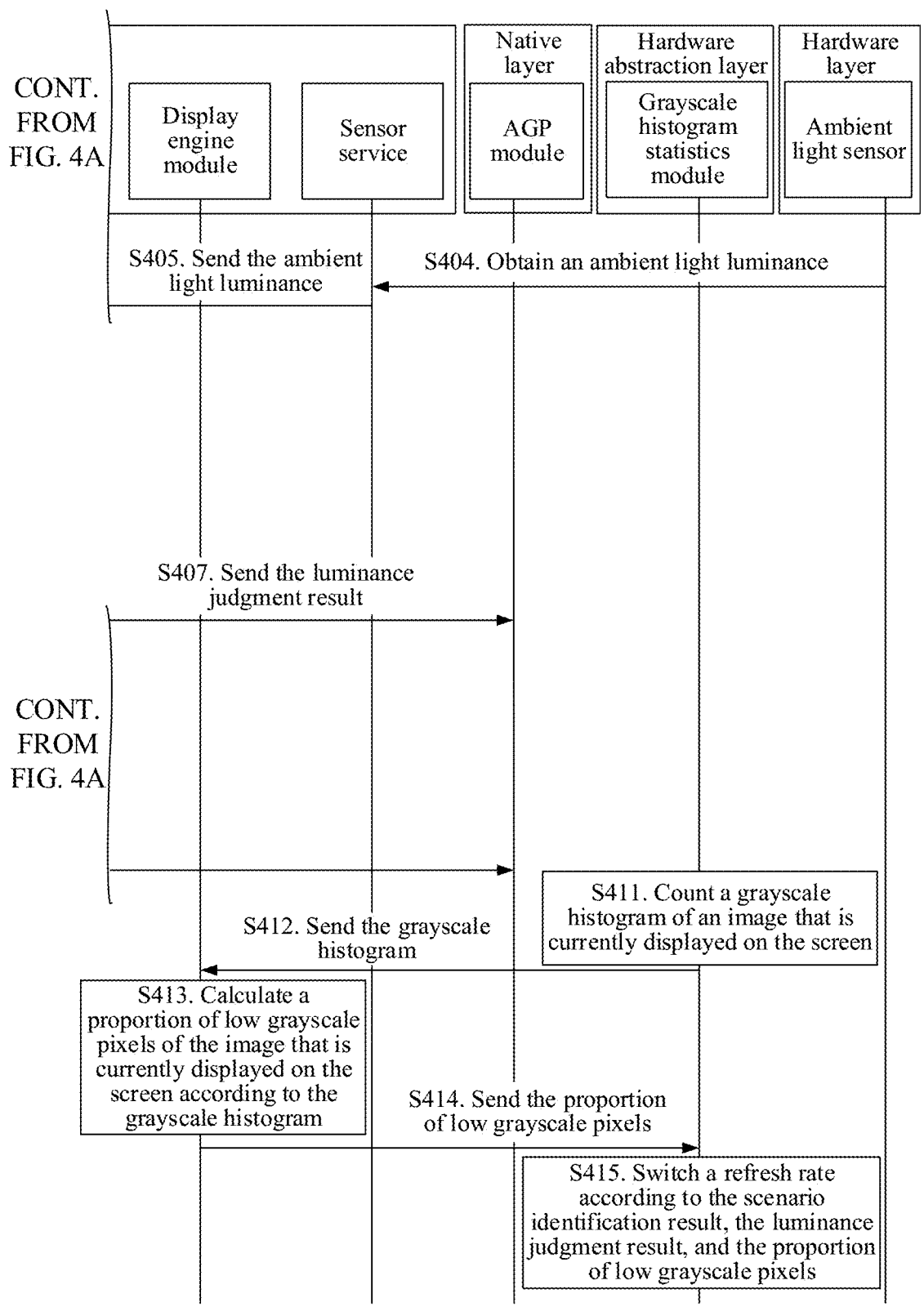

FIG. 4A and FIG. 4B are schematic diagrams of module interaction corresponding to a screen refresh rate switching method according to an embodiment of this application. It can be understood that an execution timing sequence of steps in the screen refresh rate switching method in FIG. 4A and FIG. 4B is only an example, and does not limit an execution sequence of the operations. As shown in FIG. 4A and FIG. 4B, the method may include:

S401. A screen luminance obtaining module of an application framework layer obtains a luminance parameter from a setting application of an application layer.

The luminance parameter refers to a parameter that represents a screen luminance. In an embodiment, the luminance parameter may include a luminance level. It can be understood that according to an adjustable maximum value and an adjustable minimum value of the screen luminance, the screen luminance may be divided into a plurality of levels, and different levels correspond to different screen luminance values. Optionally, the setting application may set and update the screen luminance through a power management module according to the luminance level. When the screen luminance is being set and updated by the power management module, the luminance level may be sent to the screen luminance obtaining module. Certainly, the screen luminance obtaining module may alternatively directly obtain the luminance level from the setting application. This is not limited in this application. In addition, in some other embodiments, the luminance parameter may alternatively be another parameter. For example, the luminance parameter may alternatively be a screen luminance value directly. This is not limited in this application.

Optionally, for the obtaining of the luminance parameter by the screen luminance obtaining module, the luminance parameter may be obtained periodically by the screen luminance module from the power management module, or the power management module may periodically report (that is, poll and report) the luminance parameter to the screen luminance module, or the screen luminance obtaining module may obtain the luminance parameter from the power management module in response to invocation of an APS module, or when the luminance parameter is changed, the setting application may send the changed luminance parameter to the screen luminance obtaining module. This is not limited in this embodiment of this application.

S402. The screen luminance obtaining module of the application framework layer determines a screen luminance according to the luminance parameter.

The screen luminance obtaining module determines a current screen luminance according to the luminance parameter obtained in step S401. In a possible implementation, the screen luminance obtaining module may obtain a predetermined correspondence between a screen luminance and a screen luminance level, and determine a screen luminance corresponding to the luminance level obtained in step S401 according to the correspondence.

S403. The screen luminance obtaining module of the application framework layer sends the screen luminance to an APS module.

Optionally, the screen luminance obtaining module may poll and report the screen luminance to the APS module.

S404. A sensor service of the application framework layer obtains an ambient light luminance form an ambient light sensor of a hardware layer.

Optionally, for the obtaining of the ambient light luminance by the sensor service, the ambient light luminance may be obtained periodically by the sensor service from the ambient light sensor, or the ambient light luminance may be obtained by the sensor service in response to invocation of the APS module, or when the ambient light luminance is changed, the ambient light sensor may send the changed ambient light luminance to the sensor service. This is not limited in this embodiment of this application.

S405. The sensor service of the application framework layer sends the ambient light luminance to the APS module.

Optionally, the sensor service may poll and report the ambient light luminance to the APS module.

S406. The APS module of the application framework layer judges whether the screen luminance and/or the ambient light luminance meets a preset condition to obtain a luminance judgment result.

In a possible implementation, the preset condition may be that the screen luminance is less than a preset screen luminance threshold. In another possible implementation, the preset condition may alternatively be that the ambient light luminance is less than a preset ambient light luminance threshold. In still another possible implementation, the preset condition may alternatively be that the screen luminance is less than the preset screen luminance threshold and the ambient light luminance is less than the preset ambient light luminance threshold. That is to say, the APS module judges whether the screen luminance is less than the preset screen luminance threshold, and judges whether the ambient luminance is less than the preset ambient light luminance threshold. Optionally, the preset screen luminance threshold may range from 100 nit to 200 nit, and may be, for example, 150 nit. The preset ambient light luminance threshold may range from 200 lux to 400 lux, and may be, for example, 300 lux.

S407. The APS module of the application framework layer sends the luminance judgment result to an AGP module of a Native layer.

Optionally, the APS module may send the luminance judgment result to the AGP module through Binder communication.

S408. A scenario identification module of the application framework layer obtains a running status of each application in the application layer.

Optionally, the scenario identification module may monitor the running status of each application in the application layer in real time and obtain information about an application that is currently running in a foreground.

In a possible implementation, the scenario identification module may obtain the information about the application that is currently running in the foreground through an AMS and a WMS. Specifically, when an application in the application layer starts, the application sends a package name of an application package to the AMS. The AMS creates a window according to the package name and determines window information such as a window size, a window position, and a window name. Then, the AMS sends the package name and the window information to the WMS. The WMS creates a layer according to the package name and the window information, and determines layer information such as a layer size, a layer position, and a layer name. The WMS sends the package name, the window information, the layer information, and the like to the scenario identification module.

S409. The scenario identification module of the application framework layer determines a current application scenario of an electronic device according to the running status of the application to obtain a scenario identification result.

Optionally, the scenario identification module may identify one of a variety of preset application scenarios to which the current application scenario of the electronic device belongs according to the package name, the window information, the layer information, and an application scenario whitelist that are sent by the WMS, to obtain the scenario identification result. The application scenario whitelist includes the variety of preset application scenarios. Optionally, the application scenario whitelist may be a file in the .xml format.

Optionally, a variety of application scenarios may be preset according to different grayscale statuses of the image that is displayed on the screen when different applications are used, as well as different frequencies of touching the screen when the user uses different applications, and the application scenario whitelist is generated. The variety of application scenarios may include, for example, a text reading scenario, a video or audiovisual scenario, and other scenarios. The text reading scenario refers to a scenario of reading text by using the electronic device, such as reading an e-book through an e-book application, viewing a file through office software, and browsing text through a web page. In the text reading scenario, the image is mostly text and mostly a low-grayscale image, and the user taps or slides the screen when turning pages, and touches the screen with a high frequency. The video or audiovisual scenario refers to a scenario of watching videos, audiovisual, or other content by using the electronic device, for example, watching TV series or movies through video playback software. In the video or audiovisual scenario, the image is mostly a high-grayscale image, and the user touches the screen with a low frequency. The other scenarios refer to application scenarios other than the text reading scenario and the video or audiovisual scenario. In the other scenarios, each of the grayscale status of the image and the frequency with which the user touches the screen is between that in the text reading scenario and that in the video or audiovisual scenario. Certainly, the foregoing scenarios are only examples. In actual application, more and more detailed scenario types may be set according to needs.

S410. The scenario identification module of the application framework layer sends the scenario identification result to the AGP module of the Native layer.

Optionally, the scenario identification module may send the scenario identification result to the AGP module through the Binder communication.

S411. A grayscale histogram statistics module of a hardware abstraction layer collects statistics on a grayscale histogram of an image that is currently displayed on the screen.

A specific implementation of the step is described in detail in the following embodiments.

S412. The grayscale histogram statistics module of the hardware abstraction layer sends the statistically obtained grayscale histogram to a display engine module of the application framework layer.

S413. The display engine module of the application framework layer calculates a proportion of low grayscale pixels of the image that is currently displayed on the screen according to the grayscale histogram.

A specific implementation of the step is described in detail in the following embodiments.

S414. The display engine module of the application framework layer sends the proportion of low grayscale pixels to the AGP module of the Native layer.

S415. The AGP module of the Native layer switches a refresh rate according to the scenario identification result, the luminance judgment result, and the proportion of low grayscale pixels.

The AGP module may determine a preset proportion according to the scenario identification result, and compare the proportion of low grayscale pixels with the preset proportion to determine the grayscale status of the image that is currently displayed on the screen (whether the image is a low-grayscale image). Then, the AGP switches the refresh rate based on a preset refresh rate switching policy according to the luminance judgment result and the grayscale status of the image that is currently displayed on the screen. For ease of description, in the following embodiments, the switching the refresh rate to a high refresh rate is referred to as locking the frame rate to the high refresh rate, and conditions corresponding to the locking the frame rate to the high refresh rate are referred to as frame rate locking conditions.

In a possible implementation, the refresh rate switching policy may be as follows:

In a case that the screen is in the idle state, if the screen luminance is less than the preset screen luminance threshold, the ambient light luminance is less than the preset ambient light threshold, and the proportion of low grayscale pixels of the image that is currently displayed on the screen is greater than the preset proportion, the refresh rate is set to the high refresh rate; otherwise, the refresh rate is set to the low refresh rate.

If the screen luminance is less than the preset screen luminance threshold, it indicates that the screen has a low luminance; if the ambient light luminance is less than the preset ambient light threshold, it indicates that the electronic device is currently in a low-luminance environment; and if the proportion of low grayscale pixels is greater than the preset proportion, it indicates that the image that is currently displayed on the screen is a low-grayscale image. That is to say, the frame rate locking condition in this embodiment is that the screen is in a dark light scenario and the image that is displayed on the screen is a low-grayscale image, which is hereinafter referred to as a dark light and low-grayscale scenario.

As described in the foregoing embodiments, when the screen is in a dark light and low-grayscale scenario, the switching of the refresh rate causes luminance jumping. Therefore, in this embodiment, in a case that the screen is in the idle state, if it is judged that the current scenario is a dark light and low-grayscale scenario, the refresh rate is set to the high refresh rate, that is, the frame rate is locked to the high refresh rate. In this way, when the user touches the screen again and the screen enters an activity state from the idle state, it is unnecessary to switch the refresh rate frequently, thereby avoiding the luminance jumping, avoiding discomfort to eyes of the user, and improving user experience. In addition, if the frame rate locking conditions are not currently met, that is, the screen luminance is greater than or equal to the preset screen luminance threshold, or the ambient light luminance is greater than or equal to the preset ambient light threshold, or the proportion of low grayscale pixels is less than or equal to the preset proportion, it indicates that the current scenario is not a dark light and low-grayscale scenario. In the current situation, switching of the refresh rate does not cause the luminance jumping. Therefore, the refresh rate is set to the low refresh rate, which can reduce power consumption, extend a standby duration of the electronic device, and further improve user experience.

That is to say, the screen refresh rate switching method provided in this embodiment can avoid the luminance jumping caused by switching the refresh rate, and can effectively reduce power consumption. In addition, the frame rate locking conditions in this embodiment include both conditions for the dark light scenario and conditions for the low-grayscale image. Only in a case that the current scenario is the dark light scenario and the current image is the low-grayscale image, the frame rate is locked to the high refresh rate. In other words, the frame rate locking conditions in this embodiment are strict, which can improve the accuracy of identifying the luminance jumping, improve the accuracy of the switching of the refresh rate, and make it more difficult to switch the refresh rate to the high refresh rate and easier to keep the refresh rate at the low refresh rate, thereby reducing the probability of locking the frame rate to the high refresh rate in an unnecessary case, reducing unnecessary power consumption, extending the standby duration of the electronic device, and improving user experience. The locking the frame rate to the high refresh rate in an unnecessary case includes: the frame rate is locked to the high refresh rate in a scenario with a low screen luminance and a high ambient light luminance, or the frame rate is locked to the high refresh rate in a scenario with a high screen luminance and a low ambient light luminance, or the frame rate is locked to the high refresh rate in a dark light scenario but in a case that the current image is a high-grayscale image.

In short, in this embodiment of this application, the refresh rate switching policy is that in the idle state, if three preset conditions are met, the refresh rate is set to the high refresh rate, and if none of the three preset conditions is met, the refresh rate is set to the low refresh rate. The three preset conditions are that 1) the screen luminance is less than the preset screen luminance threshold; 2) the ambient light luminance is less than the preset ambient light luminance threshold; and 3) the proportion of low grayscale pixels of the image that is currently displayed on the screen is greater than the preset proportion.

Figure 5:
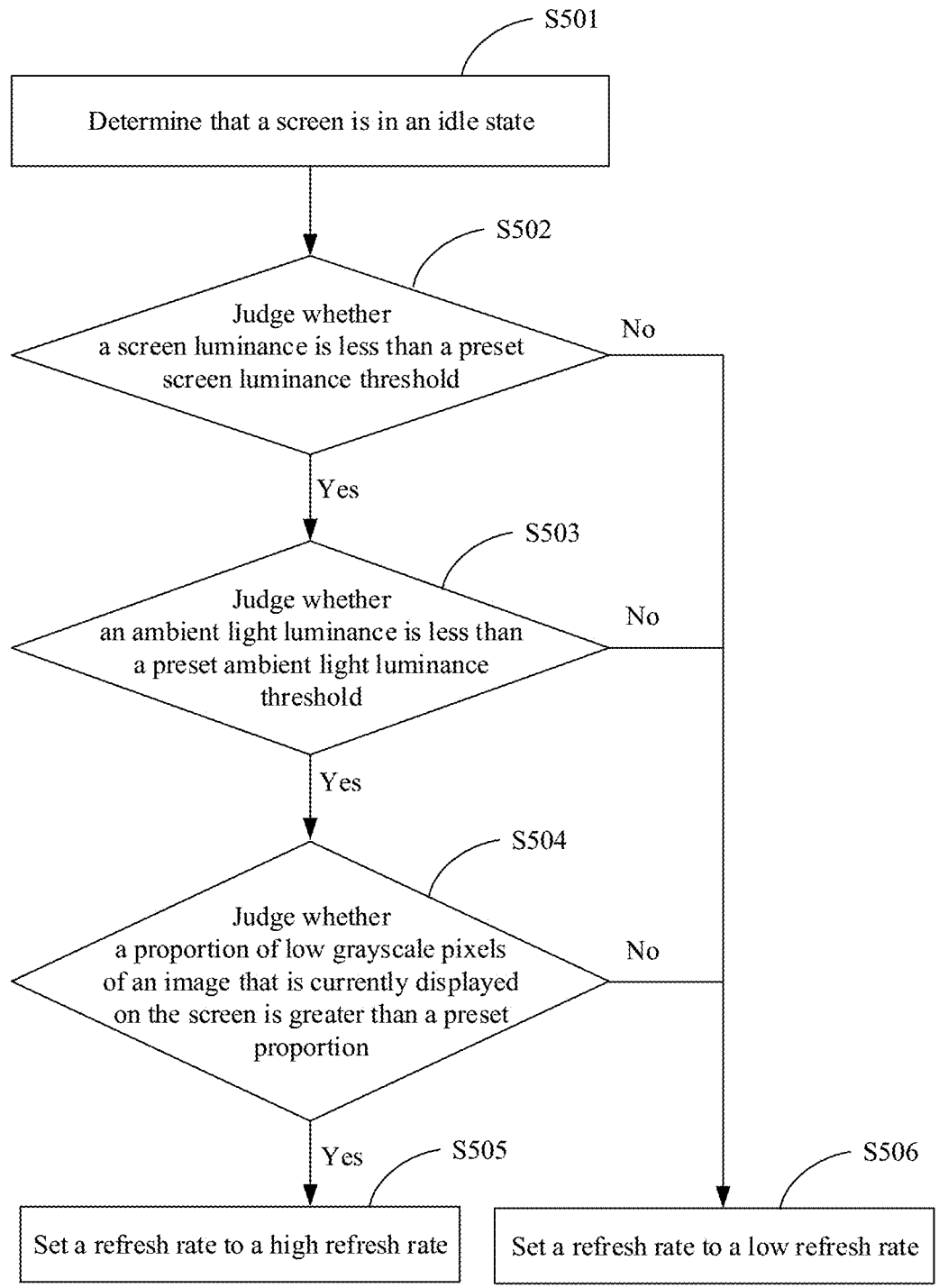
FIG. 5 is a schematic flowchart of a screen refresh rate switching method according to an embodiment of this application.

For the foregoing refresh rate switching policy, there may be a plurality of implementations in the execution process. For example, FIG. 5 is a schematic flowchart of a screen refresh rate switching method according to an embodiment of this application. As shown in FIG. 5, in this embodiment, an implementation process for the foregoing refresh rate switching policy includes:

S501. Determine that a screen is in an idle state.

Specifically, whether the screen is in the idle state may be determined by determining whether the screen detects touch data within a preset duration. If the screen does not detect the touch data within the preset duration, it indicates that the screen is in the idle state.

S502. Judge whether a screen luminance is less than a preset screen luminance threshold. If the screen luminance is less than the preset screen luminance threshold, step S503 is performed; otherwise, step S506 is performed.

S503. Judge whether an ambient light luminance is less than a preset ambient light luminance threshold. If the ambient light luminance is less than the preset ambient light luminance threshold, step S504 is performed; otherwise, step S506 is performed.

S504. Judge whether a proportion of low grayscale pixels of an image that is currently displayed on the screen is greater than a preset proportion. If the proportion of low grayscale pixels of the image that is currently displayed on the screen is greater than the preset proportion, step S505 is performed; otherwise, step S506 is performed.

S505. Set a refresh rate to a high refresh rate.

Specifically, if the current refresh rate is a low refresh rate, the refresh rate is switched to a high refresh rate. If the current refresh rate is a high refresh rate, the current refresh rate is kept unchanged.

S506. Set a refresh rate to a low refresh rate.

Specifically, if the current refresh rate is a high refresh rate, the refresh rate is switched to a low refresh rate. If the current refresh rate is a low refresh rate, the current refresh rate is kept unchanged.

It can be understood that after step S501 of determining that the screen is in the idle state is performed, the foregoing process from steps S502 to S506 may be periodically judged and executed according to a preset cycle, or may be triggered and executed by changes in the screen luminance, the ambient light luminance, or the proportion of low grayscale pixels of the image that is currently displayed on the screen. For example, when any one of the screen luminance, the ambient light luminance, or the proportion of low grayscale pixels of the image that is currently displayed on the screen changes, the foregoing process is triggered and executed. This is not limited in this application.

In addition, the execution order of the foregoing steps S502 to S506 is not limited, and the steps may be judged and executed in the order shown in the embodiment shown in FIG. 5, or judged and executed in another order. Alternatively, steps S502, S503, and S504 may be executed at the same time, as long as the judgment logic conforms to the logic of the refresh rate switching policy provided in this embodiment of this application.

In addition, in a case that the screen supports three or more refresh rates, an embodiment of this application further provides a refresh rate switching policy as follows:

In a case that the screen is in the idle state and the current refresh rate is the low refresh rate, if the preset condition 3) of the foregoing three preset conditions is met, the refresh rate is switched to an intermediate refresh rate; and then, if the preset condition 1) and the preset condition 2) are met, the refresh rate is switched to the high refresh rate. The intermediate refresh rate refers to a refresh rate that the screen can support and that is greater than the low refresh rate and less than the high refresh rate. For example, if the screen supports three refresh rates of 60 Hz, 90 Hz, and 120 Hz, 60 Hz is the low refresh rate, 90 Hz is the intermediate refresh rate, and 120 Hz is the high refresh rate.

Figure 6:
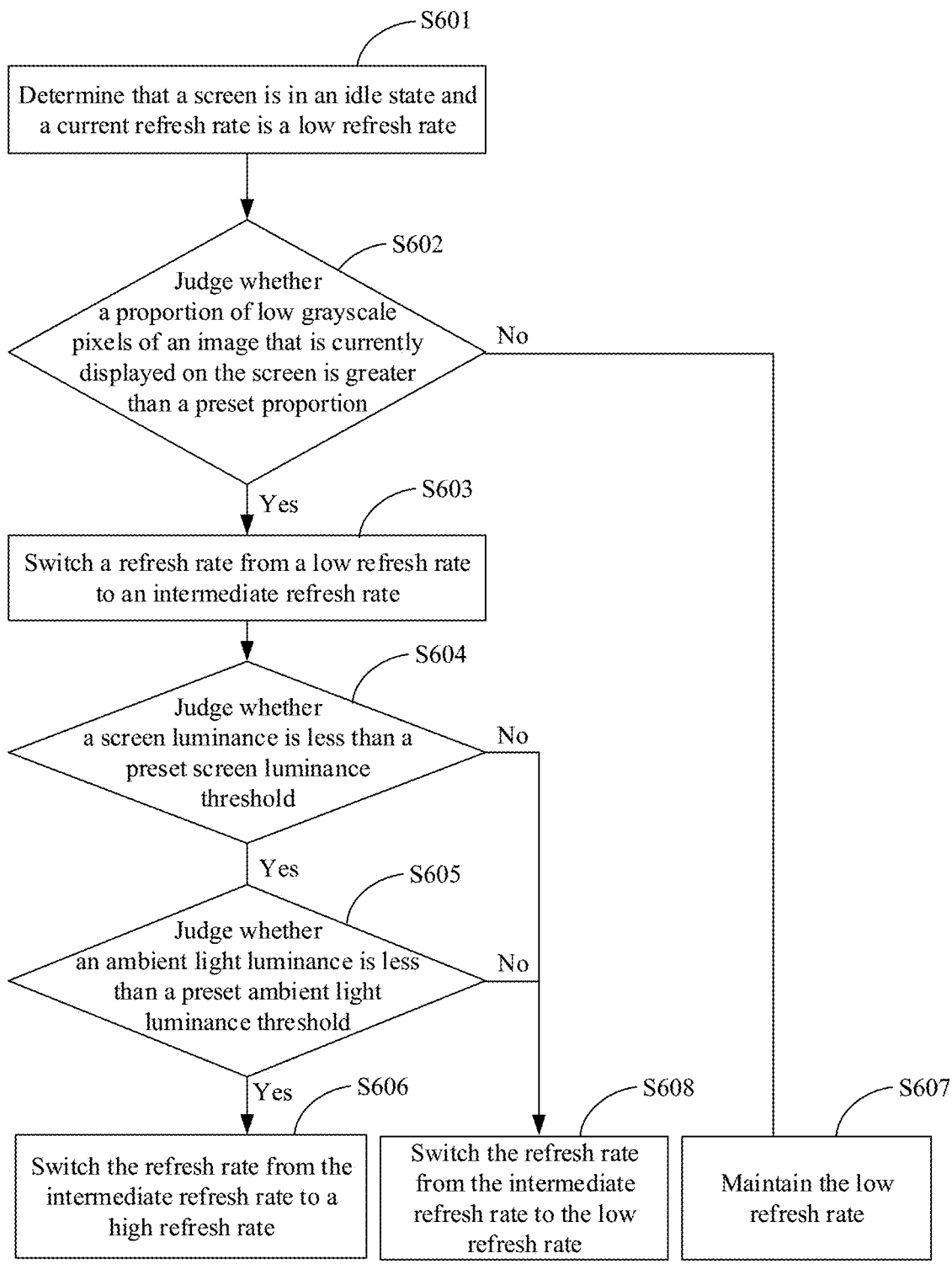
FIG. 6 is a schematic flowchart of another screen refresh rate switching method according to an embodiment of this application.

For example, FIG. 6 is a schematic flowchart of a screen refresh rate switching method according to another embodiment of this application. As shown in FIG. 6, in this embodiment, an implementation process for the foregoing refresh rate switching policy includes:

S601. Determine that a screen is in an idle state and a current refresh rate is a low refresh rate.

S602. Judge whether a proportion of low grayscale pixels of an image that is currently displayed on the screen is greater than a preset proportion. If the proportion of low grayscale pixels of the image that is currently displayed on the screen is greater than the preset proportion, step S603 is performed; otherwise, step S607 is performed.

S603. Switch the refresh rate from the low refresh rate to an intermediate refresh rate, and perform step S604.

S604. Judge whether a screen luminance is less than a preset screen luminance threshold. If the screen luminance is less than the preset screen luminance threshold, step S605 is performed; otherwise, step S608 is performed.

S605. Judge whether an ambient light luminance is less than a preset ambient light luminance threshold. If the ambient light luminance is less than the preset ambient light luminance threshold, step S606 is performed; otherwise, step S608 is performed.

S606. Switch the refresh rate from the intermediate refresh rate to a high refresh rate.

S607. Maintain the low refresh rate.

S608. Switch the refresh rate from the intermediate refresh rate to the low refresh rate.

In this embodiment, in a case that the current scenario meets a low grayscale status, the low refresh rate is switched to the intermediate refresh rate. In a case that the current scenario meets a dark light condition, the intermediate refresh rate is further switched to the high refresh rate, thereby achieving level-by-level refresh rate switching. In this way, in a case that the screen is in the idle state and the switching of the refresh rate causes luminance jumping, the low refresh rate is eventually switched to the high refresh rate, thereby locking the frame rate to the high refresh rate. When the user touches the screen again and the screen enters an activity state from the idle state, it is unnecessary to switch the refresh rate frequently, thereby avoiding the luminance jumping. In addition, the level-by-level refresh rate switching can avoid the luminance jumping caused by this switching of the refresh rate. That is to say, in the execution process of the method of this embodiment, the luminance jumping does not occur when the refresh rate is switched from the low refresh rate to the high refresh rate, further improving the user experience.

It can be understood that, in other embodiments, the condition for switching from a low refresh rate to an intermediate refresh rate in the foregoing level-by-level refresh rate switching policy may alternatively be set to another preset condition of the three preset conditions, and a plurality of preset conditions may be set. This is not limited in this embodiment of this application. For example, in an embodiment, the level-by-level refresh rate switching policy may alternatively be that when the screen is in the idle state and the current refresh rate is the low refresh rate, if the preset condition 1) and the preset condition 2) of the foregoing three preset conditions are met, the refresh rate is switched to the intermediate refresh rate; and then, if the preset condition 3) is met, the refresh rate is switched to the high refresh rate.

A specific process in which the AGP module may determine the preset proportion according to the scenario identification result is described below.

In a possible implementation, the AGP module may determine the preset proportion according to the following process:

1) The AGP module determines a threshold weight according to the scenario identification result.

Optionally, the AGP may obtain a pre-established correspondence between a scenario and a threshold weight, and then determine a target threshold weight corresponding to the current application scenario of the electronic device in the scenario identification result according to the correspondence.

In an embodiment, the correspondence between the application scenario and the threshold weight may be determined according to the grayscale status of the image in each scenario and the frequency with which the user touches the screen in each scenario. Specifically, for a scenario with a low image grayscale and a high frequency with which the user touches the screen, the possibility of the luminance jumping is large, the threshold weight is small, the preset proportion is small, the frame rate locking conditions are looser, and it is easier to judge and identify a case that luminance jumping may occur, which can reduce the occurrence of the luminance jumping and improve the user experience. For a scenario with a high image grayscale and a low frequency with which the user touches the screen, the possibility of the luminance jumping is small, the threshold weight is large, the frame rate locking conditions are stricter, the preset proportion is large, and it is easier to set the refresh rate to a low refresh rate, which can better reduce power consumption while preventing the luminance jumping.

For example, the threshold weight may be −10% in the text reading scenario, the threshold weight may be 10% in the video or audiovisual scenario, and the threshold weights may be −5% in the other scenarios. Specifically, for the text reading scenario, the grayscale of the image is low, the frequency with which the user touches the screen is high, and the possibility of the luminance jumping is large. Therefore, the threshold weight in this application scenario is set to a small value and to a negative value to reduce the preset proportion, thereby reducing the frame rate locking condition, making it easier to lock the refresh rate to the high refresh rate, and preventing the luminance jumping. For the video or audiovisual scenario, the grayscale of the image is high, the frequency with which the user touches the screen is low, and the possibility of the luminance jumping is small. Therefore, the threshold weight in this scenario is set to a large value and to a positive value to increase the preset proportion, thereby improving the frame rate locking condition, making it easier for the refresh rate to fall back to the low refresh rate, preventing the luminance jumping, and better reducing power consumption. For the other scenarios, each of the grayscale of the image and the frequency with which the user touches the screen is between that in the text reading scenario and that in the video or audiovisual scenario. Therefore, the threshold weights in the scenarios are also between the threshold weights corresponding to these two scenarios.

2) The AGP module determines a preset proportion according to the threshold weight based on a preset algorithm.

In a possible implementation, a calculation method for calculating the preset proportion may be: Preset proportion=preset basic threshold+threshold increment. The preset basic threshold is a preset value, and the preset basic threshold may be a percentage value. The threshold increment may be determined according to the threshold weight. Optionally, a correspondence between various threshold weights and threshold increments may be pre-established, and the threshold increment is determined according to the correspondence. Optionally, the threshold increment may alternatively be obtained by calculating a product of the threshold weight and a basic threshold weight, that is, preset proportion=preset basic threshold+preset basic threshold*A=preset basic threshold*(100%+A), where A represents the threshold weight.

In an embodiment, the preset basic threshold may be 70%. It is assumed that the current application scenario is a text reading scenario and the corresponding threshold weight is −10%, then preset proportion=70%*(100%−10%)=63%.

In this embodiment, the threshold weight is determined according to the scenario identification result, and the preset proportion is determined according to the threshold weight. In this way, the preset proportion can be dynamically set with reference to the current application scenario of the electronic device, that is, the conditions for judging the low-grayscale image can be dynamically set, and the grayscale of the image and the frequency with which the user touches the screen in different scenarios are fully taken into consideration, so that a judgment result of the grayscale status of the image is more accurate, thereby making the frame rate locking condition more accurate and the result of refresh rate switching also more accurate, and improving the user experience. In addition, the preset proportion is determined according to the scenario identification result, and then the refresh rate is switched, so that the screen refresh rate switching method provided in this embodiment is applicable to various application scenarios and the applicability of the method is improved.

A calculation process of the proportion of low grayscale pixels of the image in this embodiment of this application is described below.

Figure 7:
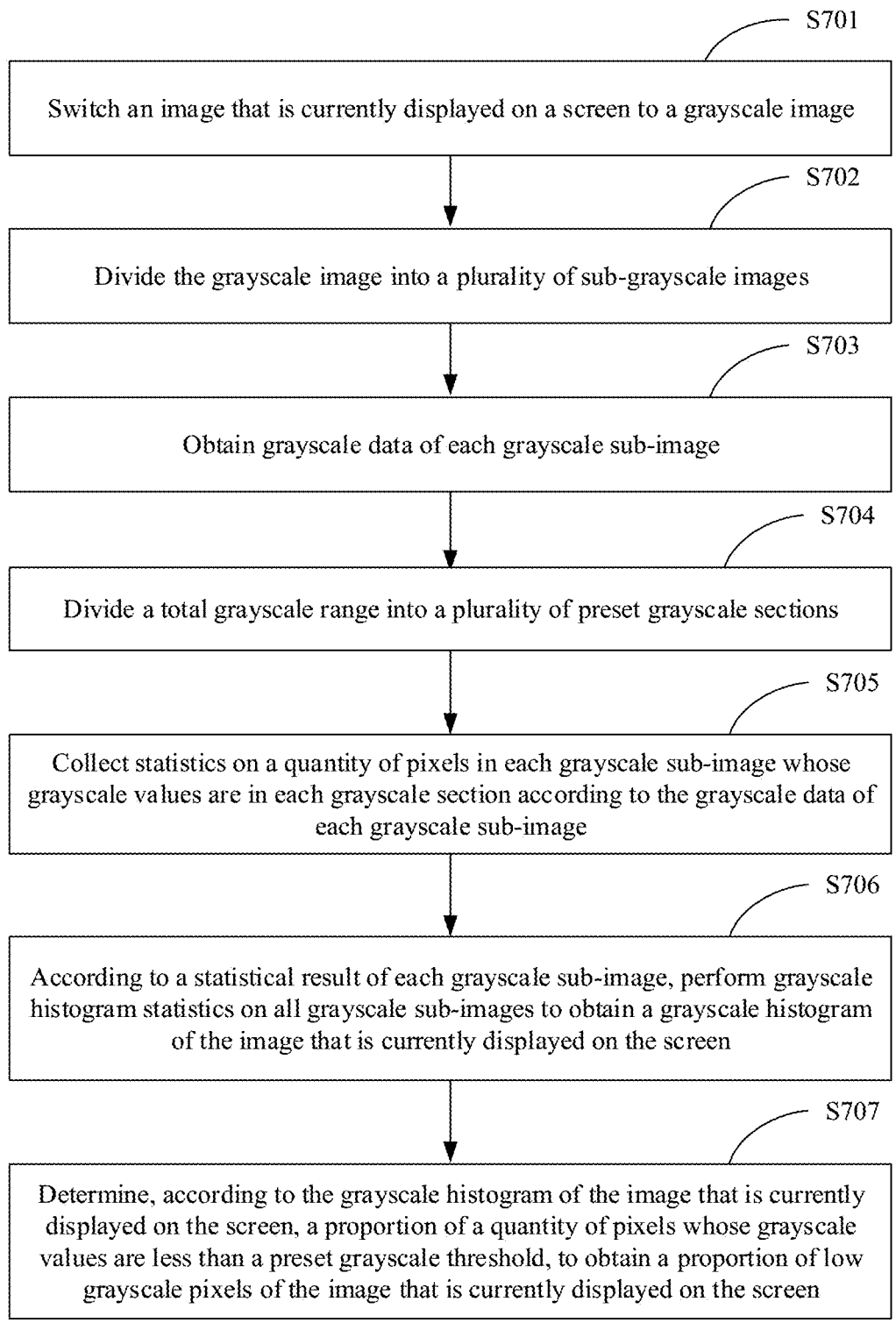
FIG. 7 is a schematic flowchart of calculating a proportion of low grayscale pixels according to an embodiment of this application.
Figure 8:
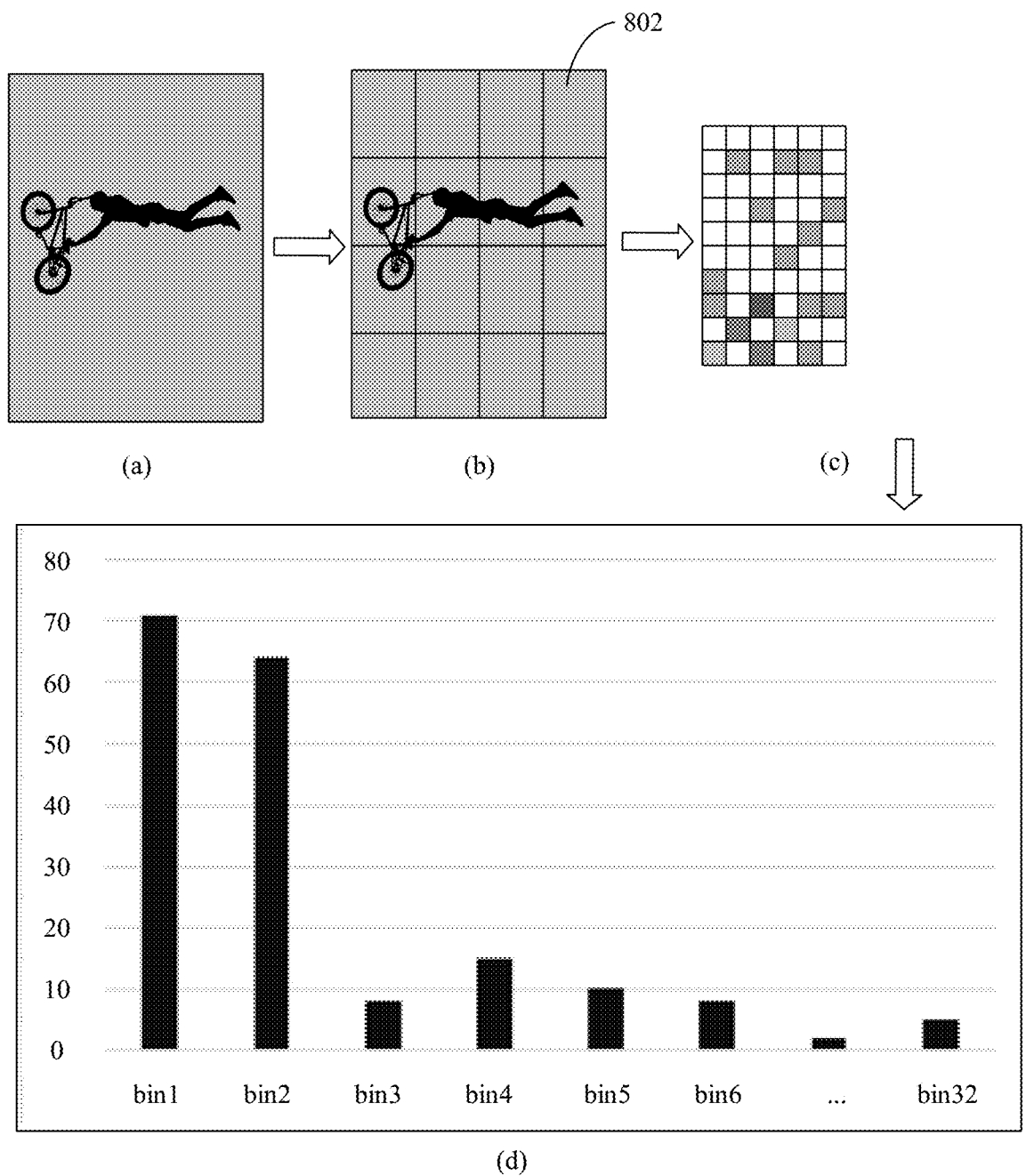
FIG. 8 is a schematic diagram of a principle of calculating a proportion of low grayscale pixels according to an embodiment of this application.

For example, FIG. 7 is a schematic flowchart of calculating a proportion of low grayscale pixels according to an embodiment of this application, and FIG. 8 is a schematic diagram of a principle of calculating a proportion of low grayscale pixels according to an embodiment of this application. Refer to FIG. 7 and FIG. 8 together. The foregoing step S411 in which a grayscale histogram statistics module of a hardware abstraction layer collects statistics on a grayscale histogram of an image that is currently displayed on the screen and S413 in which the display engine module of the application framework layer calculates a proportion of low grayscale pixels of the image that is currently displayed on the screen according to the grayscale histogram may include the following steps. In the following steps, S701 to S706 are executed by the grayscale histogram statistics module, and S707 is executed by the display engine module, which are not described in detail again below.

S701. Convert the image that is currently displayed on the screen into a grayscale image.

It may be understood that the image that is currently displayed on the screen may be a color image. The image that is currently displayed on the screen is converted into a grayscale image, as shown in (a) in FIG. 8.

S702. Divide the grayscale image into a plurality of grayscale sub-images.

In an embodiment, the grayscale image may be divided into a total of 4*4, namely, 16 grayscale sub-images, as shown in (b) in FIG. 8.

S703. Obtain grayscale data of each grayscale sub-image, where the grayscale data refers to a grayscale value of each pixel in the grayscale sub-image.

(c) in FIG. 8 is an enlarged diagram of a grayscale sub-image 802 in (b) in FIG. 8. An example in which the grayscale data of the grayscale sub-image 802 is obtained is taken for description. For example, the grayscale data of the grayscale sub-image 802 may be shown in Table 1 below. Each number in the "Grayscale data" column in Table 1 represents a grayscale value of a pixel.

TABLE 1

| Grayscale section | | Grayscale data |
|---|---|---|
| bin1 | [0-8) | 0, 0, 1, 1, 1, 1, 2, 2, 2, 3, 3, 3, 4, 4, 4, |
| bin2 | [8-17) | 4, 4, 5, 5, 5, 5, 6, 6, 6, 6, 6, 7, 7, 8, 8, |
| bin3 | [17-36) | 9, 9, 9, 10, 10, 10, 11, 11, 11, 11, 12, 12, |
| bin4 | [36-45) | 12, 15, 15, 15, 17, 17, 20, 20, 26, 34, |
| bin5 | [45-54) | 36, 37, 40, 43, 45, 48, 56, 58, 59, 60, |
| . . . | . . . | 125, 185, 245, 251, 254 |
| bin32 | [247-255) | |

S704. Divide a total grayscale range into a plurality of preset grayscale sections.

According to needs, the total grayscale range of the screen may be divided into a plurality of consecutive grayscale sections. For example, a total of 256 grayscales from a grayscale 0 to a grayscale 255 may be divided into 32 grayscale sections, and each grayscale section is referred to as a bin. Then the plurality of preset grayscale sections include a total of 32 bins from bin1 to bin32, as shown in Table 1.

S705. Collect statistics on a quantity of pixels in each grayscale sub-image whose grayscale values are in each grayscale section according to the grayscale data of each grayscale sub-image.

For example, when statistics are collected on the grayscale sub-image 802 shown in (c) in FIG. 8, it may be learned statistically according to the grayscale data in Table 1 that in the grayscale sub-image 802, a quantity of pixels whose grayscale values are within the bin1 is 28, a quantity of pixels whose grayscale values are within the bin2 is 18, . . . , and a quantity of pixels whose grayscale values are within the bin32 is 2.

S706. According to a statistical result of each grayscale sub-image, perform grayscale histogram statistics on all grayscale sub-images to obtain a grayscale histogram of the image that is currently displayed on the screen.

That is to say, through grayscale histogram statistics, statistics are collected on a total quantity of pixels whose grayscale values are in each grayscale section in all grayscale sub-images. For example, the statistically obtained grayscale histogram of the image that is currently displayed on the screen may be shown in (d) in FIG. 8. In (d) in FIG. 8, the horizontal coordinate represents different bins, and the vertical coordinate represents quantities of pixels.

S707. Determine, according to the grayscale histogram of the image that is currently displayed on the screen, a proportion of a quantity of pixels whose grayscale values are less than a preset grayscale threshold, to obtain a proportion of low grayscale pixels of the image that is currently displayed on the screen.

Optionally, the preset grayscale threshold may range from 15 to 20, and may be, for example, 17. It is assumed that the pixel of the image that is currently displayed on the screen is X and according to the statistical result, the quantity of pixels that are less than the preset grayscale threshold is Y, then the proportion of low grayscale pixels is Y/X %. It may be understood that if a grayscale value of a pixel is less than the preset grayscale threshold, it indicates that the pixel is a low grayscale pixel. According to the grayscale histogram, statistics are collected on the proportion of the quantity of pixels whose grayscale values are less than the preset grayscale threshold, that is, the proportion of low grayscale pixels in the grayscale image can be determined, thereby qualitatively determining the grayscale status of the image that is currently displayed on the screen. A larger proportion of low grayscale pixels indicates a lower grayscale of the image. Specifically, as described in the foregoing embodiments, when the proportion of low grayscale pixels is greater than the preset proportion, it indicates that the image is a low-grayscale image; and when the proportion of low grayscale pixels is less than or equal to the preset proportion, it indicates that the image is a high-grayscale image.

In this embodiment, the image that is currently displayed on the screen is converted into the grayscale image, then a grayscale value of each pixel in the grayscale image is obtained, and statistics are collected on a total quantity of pixels in the grayscale image whose grayscale values are in each grayscale section, so that a proportion of a quantity of pixels whose grayscale values are less than the preset grayscale threshold is determined, to obtain the proportion of low grayscale pixels. Statistics may be collected on the proportion of pixels with lower grayscale in the image quantitatively and accurately, thereby accurately reflecting the grayscale status of the image that is currently displayed on the screen, improving the accuracy of the judgment of the frame rate locking condition, improving the accuracy of the switching of the refresh rate, and improving the user experience. In addition, in this embodiment, the grayscale image is divided into a plurality of grayscale sub-images, and grayscale statistics are performed on each grayscale sub-image, which can further improve the accuracy of grayscale statistics, thereby improving the accuracy of calculation of the proportion of low grayscale pixels, improving the accuracy of the judgment of the frame rate locking condition, improving the accuracy of the switching of the refresh rate, and improving the user experience. In addition, in this embodiment, grayscale statistics are performed through grayscale histogram statistics, which can improve the efficiency and accuracy of grayscale statistics and have strong versatility.

It can be understood that the statistics and calculation method for the proportion of low grayscale pixels provided in this embodiment is only an example. In other embodiments, other methods may alternatively be used for statistics and calculation. For example, in another embodiment, in step S705, grayscale histogram statistics may alternatively be used to statistically obtain the grayscale histogram corresponding to each grayscale sub-image, and then in step S706, according to the grayscale histogram corresponding to each grayscale sub-image, the grayscale histogram of the image that is currently displayed on the screen is obtained. This is not limited in this embodiment of this application, as long as the proportion of low grayscale pixels can be determined.

The example of the screen refresh rate switching method provided in this embodiment of this application is described above in detail. It may be understood that to implement the foregoing functions, the electronic device includes corresponding hardware and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application with reference to embodiments, but it should not be considered that the implementation goes beyond the scope of this application.

In the embodiments of this application, function modules of the electronic device may be divided according to the foregoing method example. For example, each function module may be divided according to each function, such as a detection unit, a processing unit, and a display unit, or two or more functions may be integrated into one module. The integrated module is implemented in the form of hardware, or is implemented in the form of a software functional module. It should be noted that the module division in embodiments of this application is an example, and is merely logical function division. There may be another division manner in an actual implementation.

It should be noted that all related content of the steps in the foregoing method embodiments may be referenced to function descriptions of corresponding functional modules. Details are not described herein again.

The electronic device provided in this embodiment is configured to perform the screen refresh rate switching method. Therefore, effects that are the same as those of the foregoing implementation method can be achieved.

When an integrated unit is used, the electronic device may further include a processing module, a storage module, and a communication module. The processing module may be configured to control and manage an operation of the electronic device. The storage module may be configured to support the electronic device in executing stored program code, data, and the like. The communication module may be configured to support communication between the electronic device and another device.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 2.

An embodiment of this application further provides a computer-readable storage medium, the computer-readable storage medium storing a computer program, and the computer program, when executed by a processor, enabling the processor to perform the screen refresh rate switching method in any one of the foregoing embodiments.

An embodiment of this application further provides a computer program product, the computer program product, when run on a computer, enabling the computer to perform the foregoing related steps, to perform the screen refresh rate switching method in the foregoing embodiments.

In addition, an embodiment of this application further provides an apparatus. The apparatus may be specifically a chip, a component, or a module. The apparatus may include a processor and a memory that are connected. The memory is configured to store a computer-executable instruction, and when the apparatus runs, the processor may execute the computer-executable instruction stored in the memory, to enable the chip to perform the screen refresh rate switching method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

According to the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a read-only memory (read only memory, ROM), a RAM (random access memory, RAM), a magnetic disk, a compact disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A screen refresh rate switching method, performed by an electronic device, the method comprising:
    identifying a current application scenario of the electronic device;
    obtaining a correspondence between a preset application scenario and a threshold weight;
    determining, according to the correspondence, a target threshold weight corresponding to the current application scenario of the electronic device;
    determining a threshold increment according to the target threshold weight;
    summing a preset basic threshold and the threshold increment to obtain a preset proportion; and
    setting the screen refresh rate of a screen by:
        when the screen is in an idle state, setting, when a plurality of preset conditions are met, the screen refresh rate of the screen to a first refresh rate, wherein the plurality of preset conditions comprises that a screen luminance is less than a preset screen luminance threshold, an ambient light luminance is less than a preset ambient light luminance threshold, and a proportion of low grayscale pixels of an image that is currently displayed on the screen is greater than the preset proportion, and wherein the proportion of low grayscale pixels is a proportion of pixels in the image whose grayscale values are less than a preset grayscale threshold; and
        setting, when none of the plurality of preset conditions is met, the screen refresh rate of the screen to a second refresh rate, wherein the second refresh rate is less than the first refresh rate.

2. The method according to claim 1, wherein determining the threshold increment according to the target threshold weight comprises:
    calculating a product of the target threshold weight and the preset basic threshold to obtain the threshold increment.

3. The method according to claim 1, wherein the current application scenario comprises a text reading scenario or a video or audiovisual scenario.

4. The method according to claim 1, wherein setting, when the plurality of preset conditions are met, the screen refresh rate of the screen to the first refresh rate comprises:
    when the screen refresh rate of the screen is the second refresh rate at a current moment, switching, when a target condition is met, the refresh rate of the screen from the second refresh rate to a third refresh rate, wherein the target condition is at least one preset condition of the plurality of preset conditions, and the third refresh rate is greater than the second refresh rate and less than the first refresh rate; and
    switching, when conditions other than the target condition of the plurality of preset conditions are met, the screen refresh rate of the screen from the third refresh rate to the first refresh rate.

5. The method according to claim 4, wherein the target condition is that the proportion of low grayscale pixels of the image that is currently displayed on the screen is greater than the preset proportion.

6. The method according to claim 1, wherein when the screen is in the idle state, the method further comprises:
    judging whether the screen luminance is less than the preset screen luminance threshold;

determining, when the screen luminance is greater than or equal to the preset screen luminance threshold, that the plurality of preset conditions are not met;

judging, when the screen luminance is less than the preset screen luminance threshold, whether the ambient light luminance is less than the preset ambient light luminance threshold;

determining, when the ambient light luminance is greater than or equal to the preset ambient light luminance threshold, that the plurality of preset conditions are not met;

judging, when the ambient light luminance is less than the preset ambient light luminance threshold, whether the proportion of low grayscale pixels of the image that is currently displayed on the screen is greater than the preset proportion;

determining, when the proportion of low grayscale pixels of the image that is currently displayed on the screen is less than or equal to the preset proportion, that the plurality of preset conditions are not met; and determining, when the proportion of low grayscale pixels of the image that is currently displayed on the screen is greater than the preset proportion, that the plurality of preset conditions are met.

7. The method according to claim 1, wherein the electronic device comprises a screen luminance obtaining module, an adaptive power saving (APS) module, a sensor service, and a display engine module that are located at an application framework layer, a grayscale histogram statistics module located at a hardware abstraction layer, an advances graphic projects (AGP) module located at a native layer, and an ambient light sensor located at a hardware layer, and the method further comprises:

determining, by the screen luminance obtaining module, the screen luminance, and sending the screen luminance to the APS module;

obtaining, by the sensor service through the ambient light sensor, the ambient light luminance, and sending the ambient light luminance to the APS module;

determining, by the APS module, whether the screen luminance is less than the preset screen luminance threshold, and determining whether the ambient light luminance is less than the preset ambient light luminance threshold to obtain a luminance judgment result, and sending the luminance judgment result to the AGP module;

collecting, by the grayscale histogram statistics module, statistics on a grayscale histogram of the image that is currently displayed on the screen, and sending the grayscale histogram to the display engine module;

calculating, by the display engine module according to the grayscale histogram, the proportion of low grayscale pixels of the image that is currently displayed on the screen, and sending the proportion of low grayscale pixels of the image that is currently displayed on the screen to the AGP module; and when the screen is in the idle state, setting, by the AGP module when it is determined that the plurality of preset conditions are met, the screen refresh rate of the screen to the first refresh rate; or setting, when it is determined that none of the plurality of preset conditions is met, the screen refresh rate of the screen to the second refresh rate.

8. The method according to claim 7, wherein the electronic device further comprises a scenario identification module located at the application framework layer, and the method further comprises:

determining, by the scenario identification module according to a running status of an application in the electronic device, the current application scenario of the electronic device to obtain a scenario identification result, and sending the scenario identification result to the AGP module; and determining, by the AGP module, the preset proportion according to the current application scenario of the electronic device.

9. The method according to claim 7, wherein the electronic device further comprises a power management module located at the application framework layer and a setting application located at an application layer, and determining, by the screen luminance obtaining module, the screen luminance comprises:

obtaining, by the power management module through the setting application, a luminance level, and sending the luminance level to the screen luminance obtaining module; and determining, by the screen luminance obtaining module, the screen luminance according to the luminance level.

10. The method according to claim 7, wherein sending the luminance judgment result to the AGP module comprises:

sending, by the APS module through Binder communication, the luminance judgment result to the AGP module; and wherein sending the proportion of low grayscale pixels of the image that is currently displayed on the screen to the AGP module comprises:

sending, by the display engine module through the Binder communication, the proportion of low grayscale pixels of the image that is currently displayed on the screen to the AGP module.

11. An electronic device, comprising:
at least one processor;
at least one memory; and
an interface; and
wherein the at least one processor, the at least one memory, and the interface cooperate with each other to enable the electronic device to perform operations comprising:
identifying a current application scenario of the electronic device;
obtaining a correspondence between a preset application scenario and a threshold weight;
determining, according to the correspondence, a target threshold weight corresponding to the current application scenario of the electronic device;
determining a threshold increment according to the target threshold weight;
summing a preset basic threshold and the threshold increment to obtain a preset proportion; and
setting a screen refresh rate of a screen by:
when the screen is in an idle state, setting, when a plurality of preset conditions are met, the screen refresh rate of the screen to a first refresh rate, wherein the plurality of preset conditions comprises that a screen luminance is less than a preset screen luminance threshold, an ambient light luminance is less than a preset ambient light luminance threshold, and a proportion of low grayscale pixels of an image that is currently displayed on the screen is greater than the preset proportion, and the proportion of low grayscale pixels is a proportion of pixels in the image whose grayscale values are less than a preset grayscale threshold; and setting, when none of the plurality of preset conditions is met, the screen refresh rate of the screen to a second refresh rate, wherein the second refresh rate is less than the first refresh rate.

12. The electronic device according to claim 11, wherein determining the threshold increment according to the target threshold weight comprises:
   calculating a product of the target threshold weight and the preset basic threshold to obtain the threshold increment.

13. The electronic device according to claim 11, wherein the current application scenario comprises a text reading scenario or a video or audiovisual scenario.

14. The electronic device according to claim 11, wherein setting, when the plurality of preset conditions are met, the screen refresh rate of the screen to the first refresh rate comprises:
   when the screen refresh rate of the screen is the second refresh rate at a current moment, switching, when a target condition is met, the refresh rate of the screen from the second refresh rate to a third refresh rate, wherein the target condition is at least one preset condition of the plurality of preset conditions, and the third refresh rate is greater than the second refresh rate and less than the first refresh rate; and
   switching, when conditions other than the target condition of the plurality of preset conditions are met, the screen refresh rate of the screen from the third refresh rate to the first refresh rate.

15. The electronic device according to claim 14, wherein the target condition is that the proportion of low grayscale pixels of the image that is currently displayed on the screen is greater than the preset proportion.

16. A non-transitory computer-readable storage medium, the non-transitory computer-readable storage medium storing a computer program, and the computer program, when executed by at least one processor, enabling an electronic device to perform operations comprising:
   identifying a current application scenario of the electronic device;
   obtaining a correspondence between a preset application scenario and a threshold weight;
   determining, according to the correspondence, a target threshold weight corresponding to the current application scenario of the electronic device;
   determining a threshold increment according to the target threshold weight;
   summing a preset basic threshold and the threshold increment to obtain a preset proportion; and
   setting a screen refresh rate of a screen by:
      when the screen is in an idle state, setting, when a plurality of preset conditions are met, the screen refresh rate of the screen to a first refresh rate, wherein the plurality of preset conditions comprises that a screen luminance is less than a preset screen luminance threshold, an ambient light luminance is less than a preset ambient light luminance threshold, and a proportion of low grayscale pixels of an image that is currently displayed on the screen is greater than the preset proportion, and the proportion of low grayscale pixels is a proportion of pixels in the image whose grayscale values are less than a preset grayscale threshold; and
      setting, when none of the plurality of preset conditions is met, the screen refresh rate of the screen to a second refresh rate, wherein the second refresh rate is less than the first refresh rate.

17. The non-transitory computer-readable storage medium according to claim 16, wherein determining the threshold increment according to the target threshold weight comprises:
   calculating a product of the target threshold weight and the preset basic threshold to obtain the threshold increment.

18. The non-transitory computer-readable storage medium according to claim 16, wherein the current application scenario comprises a text reading scenario or a video or audiovisual scenario.

19. The non-transitory computer-readable storage medium according to claim 16, wherein setting, when the plurality of preset conditions are met, the screen refresh rate of the screen to the first refresh rate comprises:
   when the screen refresh rate of the screen is the second refresh rate at a current moment, switching, when a target condition is met, the refresh rate of the screen from the second refresh rate to a third refresh rate, wherein the target condition is at least one preset condition of the plurality of preset conditions, and the third refresh rate is greater than the second refresh rate and less than the first refresh rate; and
   switching, when conditions other than the target condition of the plurality of preset conditions are met, the screen refresh rate of the screen from the third refresh rate to the first refresh rate.

20. The non-transitory computer-readable storage medium according to claim 19, herein the target condition is that the proportion of low grayscale pixels of the image that is currently displayed on the screen is greater than the preset proportion.

* * * * *

UNITED STATES PATENT AND TRADEMARK OFFICE
CERTIFICATE OF CORRECTION

PATENT NO. : 12,283,237 B2
APPLICATION NO. : 18/563221
DATED : April 22, 2025
INVENTOR(S) : Hou et al.

It is certified that error appears in the above-identified patent and that said Letters Patent is hereby corrected as shown below:

In the Claims

In Column 32, in Claim 20, Line 46, delete "herein" and insert -- wherein --.

Signed and Sealed this
Twenty-seventh Day of May, 2025

Coke Morgan Stewart
*Acting Director of the United States Patent and Trademark Office*